(12) United States Patent
Sakurai et al.

(10) Patent No.: US 7,583,301 B2
(45) Date of Patent: Sep. 1, 2009

(54) IMAGING DEVICE HAVING CHROMATIC ABERRATION SUPPRESSION

(75) Inventors: Junzou Sakurai, Tokyo (JP); Takanori Miki, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 528 days.

(21) Appl. No.: 11/423,770

(22) Filed: Jun. 13, 2006

(65) Prior Publication Data
US 2007/0097267 A1 May 3, 2007

(30) Foreign Application Priority Data
Jan. 11, 2005 (JP) .................. 2005-318847

(51) Int. Cl.
H04N 5/217 (2006.01)
(52) U.S. Cl. ................................. 348/241; 348/252
(58) Field of Classification Search ........... 348/241, 348/252–255, 612; 382/254
See application file for complete search history.

(56) References Cited

U.S. PATENT DOCUMENTS 5,627,583 A * 5/1997 Nakamura et al. ........... 348/72

2004/0161256 A1 * 8/2004 Ando ........................ 399/79
2006/0232681 A1 * 10/2006 Okada ...................... 348/222.1
2007/0116375 A1 * 5/2007 Utsugi et al. ............... 382/264

FOREIGN PATENT DOCUMENTS

JP 2003-060983 2/2003
JP 2005-136917 5/2005

* cited by examiner

*Primary Examiner*—Lin Ye
*Assistant Examiner*—Gevell Selby
(74) *Attorney, Agent, or Firm*—Pamela R. Crocker

(57) ABSTRACT

Accurately suppress chromatic aberration arising in a subject image is described. An image signal, which is obtained by a lens and a CCD and pertains to a subject image, is subjected to white balance adjustment performed by a white balance adjustment circuit. The signal is supplied to a color-blurring detection circuit before undergoing gamma correction. The color-blurring detection circuit has a low slice circuit, a high-pass filter, and a high clip circuit; detects an edge portion of a highlight of a G signal constituting the image signal; and supplies the detected edge portion as a color-blurring detection signal to a color-blurring suppressor circuit disposed subsequent to a γ correction circuit. The color-blurring suppressor circuit corrects color-difference signals CB, CR, which have been subjected to gamma correction, by use of the color-blurring detection signal, thereby suppressing the color-blurring having arisen in the edge of a highlight of the image.

26 Claims, 22 Drawing Sheets

SLICE LEVEL

CLIP LEVEL

MAKE G WIDE

Fig. 8 (d) MAKE B NARROW

IMAGING DEVICE HAVING CHROMATIC ABERRATION SUPPRESSION

FIELD OF THE INVENTION

The present invention relates to a chromatic aberration suppressor circuit, and more particularly, to a technique for generating an appropriate color image by suppressing chromatic aberration, such as axial chromatic aberration, chromatic aberration of magnification, or the like.

BACKGROUND OF THE INVENTION

A refraction factor of light varies according to a wavelength. Light of a shorter wavelength causes great refraction, and light of a longer wavelength causes small refraction. This induces a phenomenon, called chromatic aberration, of a position (hereinafter simply called an "image formation position"), where an image is formed, being changed by the wavelength of light.

For instance, in the case of a beam entering a lens from one point on an optical axis, an image formation position varies according to the wavelength of the beam. When a position where a green image is formed is taken as P, blue (B) light whose wavelength is shorter than that of green light forms an image at a position closer to the lens than P. Red (R) light, whose wavelength is longer than that of green light, forms an image at a position more distant from the lens than P. As mentioned above, aberration of an image formation position on the optical axis varying according to a wavelength is called axial chromatic aberration. When a position, where green light forms an image, is taken as a reference point on an image formation plane, a B image and an R image are out of focus as compared with the G image and become inferior in sharpness. When the focus position of the lens is adjusted so as to cause G light to come into focus, brightness of G light sharply changes stepwise at an edge, whilst the brightness of R light and that of B light change smoothly. As mentioned above, the brightness distributions of R, G, and B vary because of the principle of an overlap among point spread distributions. The greater the blur in an image on the image formation plane, the less clear a boundary area of the edge of the image. Hence, the image exhibits a smooth change. Accordingly, when a subject whose edge exhibits such a brightness distribution is photographed, a color is not accurately reproduced around the edge, thereby generating a false color. When an oblique beam from outside of the optical axis has entered the lens, the size of an image varies according to a wavelength, as does an image formation position. Such aberration is called chromatic aberration of magnification. By means of chromatic aberration of magnification, focus is not attained at the same position, even on the image formation plane. As a result, an image similarly becomes inferior in sharpness. In order to suppress such chromatic aberration, there is a method for previously measuring and storing, in memory, data pertaining to chromatic aberration of magnification of a lens; and performing corrections by reference to the data during photographing operation.

Japanese Patent Publication 2003-060983 discloses a technique for, in order to correct chromatic aberration of a lens when a high-brightness portion of the image signal is saturated, estimating original brightness by use of another image signal captured at an exposure level that at which an image signal to be corrected is captured—in relation to a signal portion having saturated brightness; and correcting chromatic aberration on the basis of the estimated brightness. Chromatic aberration is corrected by means of utilizing the magnitude (absolute value) of a G signal, which has passed through a high-pass filter, for gain control with respect to color-difference signals R-Y and B-Y, both being achieved in the edge portion, such that the gain of the color difference signals is reduced when the absolute value of the G signal is large.

Japanese Patent Publication 2005-136917 describes correction processing for diminishing visibility of an image component corresponding to non-image formation light in order to eliminate a flare from an optical diffraction element.

However, under the method for previously storing in memory data pertaining to chromatic aberration of magnification of a lens, an increase in memory capacity results in an increase in the number of adjustment processes. In consideration of the influence of axial chromatic aberration, there is a problem of difficulty being encountered in performing accurate corrections.

Further, although the technique described in Japanese Patent Publication 2003-060983 does not require previous storage of data for correction purpose into memory, a necessity for performing exposure twice will arise.

SUMMARY OF THE INVENTION

Accordingly, the present invention provides a device capable of accurately suppressing chromatic aberration with a simpler configuration and enhancing image quality.

The present invention provides a chromatic aberration suppressor circuit for suppressing chromatic aberration which arises in a high-brightness portion of a subject, the circuit comprising:

detection means for detecting a chromatic aberration portion from an image signal which pertains to the subject and is to undergo gamma correction;

gamma correction means for subjecting the image signal to gamma correction; and suppression means for suppressing a color component of the chromatic aberration portion, which has been detected by the detection means, in the image signal after having undergone gamma correction performed by the gamma correction means.

The present invention also provides a chromatic aberration suppressor circuit for suppressing chromatic aberration which arises in a high-brightness portion of a subject, the circuit comprising:

detection means for detecting a chromatic aberration portion from an image signal which pertains to the subject and is to undergo gamma correction;

suppression means for suppressing a color component and a brightness component of the chromatic aberration portion, which have been detected by the detection means, in the image signal; and gamma correction means for subjecting to gamma correction the image signal suppressed by the suppression means.

In one aspect of the present invention, the detection means detects a chromatic portion, by means of comprising a slice circuit for slicing, at a first predetermined level, the image signal that is to undergo gamma correction; a high-pass filter for extracting a high-frequency component of an image signal sliced by the slice circuit; and a clip circuit for clipping the signal, which has been output from the high-pass filter, at a second predetermined level.

The chromatic aberration suppressor circuit may be incorporated into an imaging device, such as a digital camera. Further, the chromatic aberration suppression processing may be implemented by software rather than by hardware.

According to the present invention, data for correction purpose do not need to be stored in memory in advance.

Chromatic aberration can be suppressed simply and accurately. Since chromatic aberration of the image signal having undergone gamma correction is suppressed, variations in brightness level attributable to gamma correction can also be suppressed. Further, even when chromatic aberration in the image signal that is to undergo gamma correction, a brightness component and chromatic aberration can be simultaneously corrected. Accordingly, even in subsequent gamma correction, a brightness level can be maintained at an appropriate value even after gamma correction.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

By means of taking as an example a case where the present invention is applied to a digital camera, embodiments of the present invention will be described hereinbelow by reference to the drawings.

First Embodiment

Figure 1:
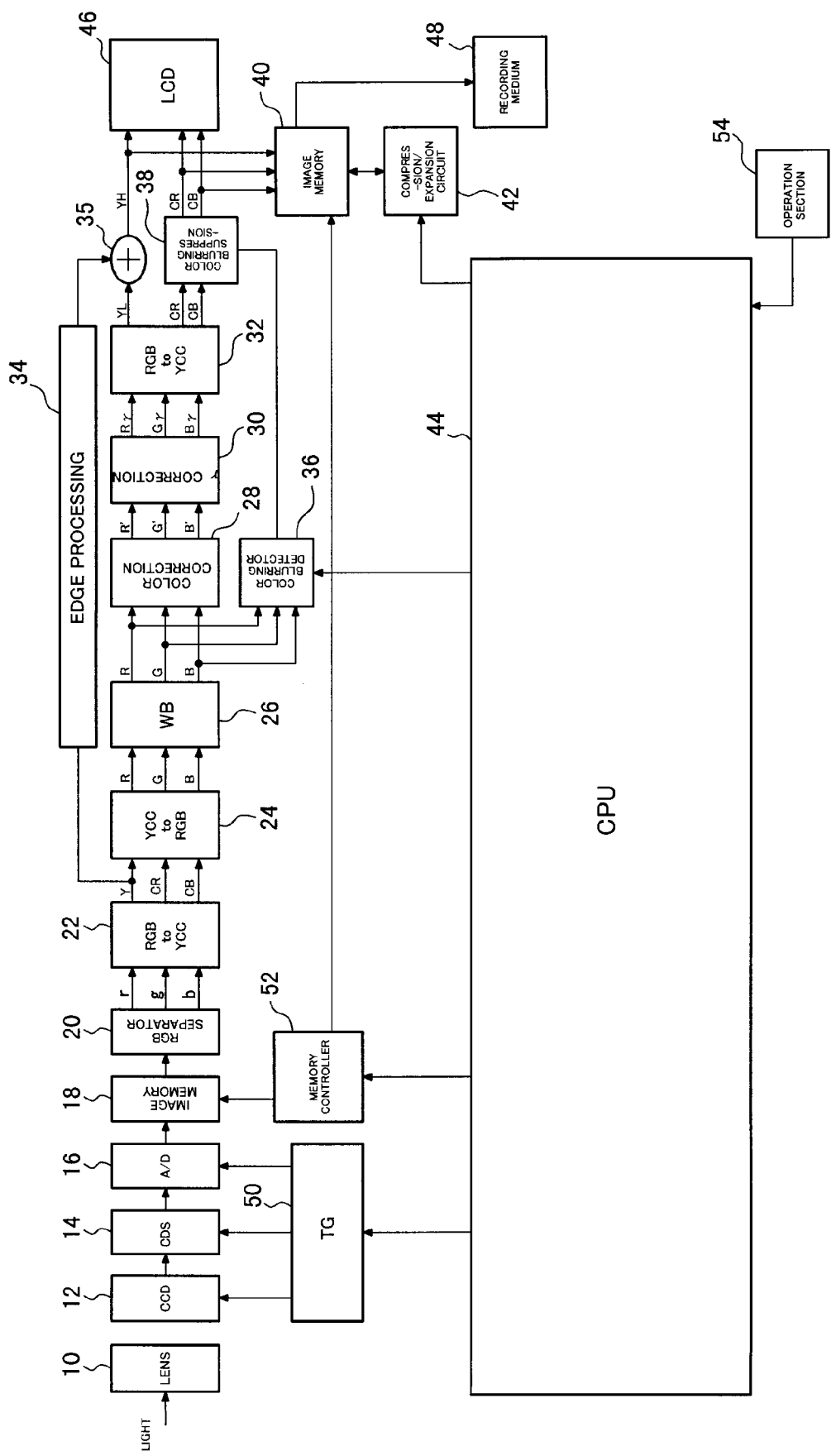
FIG. 1 is a block diagram of an entire digital camera according to an embodiment.

FIG. 1 is a block diagram showing the configuration of a digital camera according to a first embodiment of the present invention. A lens 10 induces light originating from a subject to form an image on a CCD 12 which acts as an imaging element. The CCD 12 has a color filter of a Bayer pattern; subjects subject light to photoelectric conversion to thereby generate an image signal; and supplies the image signal to a CDS 14. The CDS 14 subjects the image signal from the CCD 12 to correlation dual sampling and supplies the thus-sampled signal to an analog-to-digital (A/D) converter 16. The A/D converter 16 converts the image signal into a digital signal, and stores the thus-converted digital signal into image memory 18. The CCD 12, the CDS 14, and the A/D converter 16 operate in synchronism with a clock signal supplied from a timing generator (TG) 50. Reading and writing of data from and to the image memory 18 are controlled by a memory controller 52. The image signal read from the image memory 18 is separated into an R signal, a G signal, and a B signal by an RGB separation circuit 20, and the thus-separated signals are supplied to a brightness color-difference signal generation circuit 22. The brightness color-difference signal generation circuit 22 generates a brightness signal Y and color-difference signals CR, CB from the R signal, the G signal, and the B signal, and supplies the thus-generated signals to an RGB signal generation circuit 24. The RGB signal generation circuit 24 again generates the R signal, the G signal, and the B signal from the brightness signal Y and the color-difference signals CR, CB. The reason why the R signal, the G signal, and the B signal are restored after once have been converted into the brightness signal and the color-difference signals is that the brightness signal Y is required for detecting the edge of the image signal. Specifically, the brightness signal Y generated by the brightness color-difference signal generation circuit 22 is supplied to an edge-processing circuit 34, to thus detect an edge. The RGB signal generation circuit 24 supplies the thus-generated R signal, the G signal, and the B signal to a white balance (WB) adjustment circuit 26. The white balance (WB) adjustment circuit 26 adjusts white balance among the R signal, the G signal, and the B signal and supplies the R, G, and B signals to a color correction circuit 28. At least some of the R, G, and B signals, which have been output from the white balance adjustment circuit 26, are supplied to a color-blurring detection circuit (a chromatic aberration detection circuit) 36. The color correction circuit 28 subjects the R, G, and B signals to color correction and supplies the thus-corrected R, G, and B signals to a γ correction circuit 30. The γ correction circuit 30 subjects the R, G, and B signals to gamma correction, to thus generate an Rγ signal, a Gγ signal, and a Bγ signal and supply these signals to a brightness color-difference signal generation circuit 32. The brightness color-difference signal generation circuit 32 generates a brightness signal YL and the color-difference signals CR, CB from the gamma-corrected signals, and outputs the signals YL, CR, and CB. The brightness signal YL is supplied to an addition circuit 35, and the color-difference signals CR, CB are supplied to a color-blurring suppressor circuit (chromatic aberration suppressor circuit) 38. The addition circuit 35 adds the brightness signal, which has been subjected to edge processing in the edge processing circuit 34, to the gamma-corrected brightness signal, and stores the result of addition into image memory 40. On the basis of a color-blurring detection signal detected by the color-blurring detection circuit 36, the color-blurring suppressor circuit 38 suppresses chromatic aberration included in the color-difference signals, as will be described later, and stores the color-difference signals into the image memory 40. The brightness signal and the color-difference signals stored in the image memory 40 are compressed into a format such as a JPEG format, or the like, by means of a compression-and-expansion circuit 42 or stored while remaining in the form of RAW data into a recording medium 48 such as flash memory. The image data stored in the recording medium 48 are expanded by the compression-and-expansion circuit 42, and the thus-expanded image data are converted into a display format, such as an NTSC format or the like. The thus-converted image data are displayed on an LCD 46. Reading and writing of data from and into the image memory 40 are controlled by the memory controller 52. The timing generator (TG) 50, the memory controller 52, the color-blurring detection circuit 36, and the compression-and-expansion circuit 42 are controlled by a CPU 44, and the CPU 44 is controlled in accordance with an operation signal input by way of an operation section 54 that can be controlled by the user.

One of the features of the present embodiment lies in that occurrence of color-blurring (chromatic aberration) is detected while at least one of the R, B, and G signals, which are to be subjected to gamma correction performed by the γ correction circuit 30; particularly the G signal, is used as a main signal, and the R, B signals used taken as sub-signals; and that there is performed processing for suppressing color-blurring of the gamma-corrected color-difference signals. Specifically, a circuit for detecting color-blurring is provided in a stage prior to the γ correction circuit 30, and another circuit for suppressing color-blurring is provided on a stage subsequent to the γ correction circuit 30. The reason for this is that, if color-blurring is suppressed at a stage prior to the γ correction circuit 30, the areas of image data, which have undergone γ correction to suppress color-blurring, will become gray later (the areas will be brought to a black level as a result of suppression of color-blurring, but the brightness of the black level is corrected through gamma correction), so that image quality is deteriorated, to thus diminish the effect of suppressing color-blurring.

The color-blurring detection circuit (chromatic aberration detection circuit) 36 and the color-blurring suppressor circuit (chromatic aberration suppressor circuit) 38 of the present embodiment will be described hereinbelow.

Figure 2:
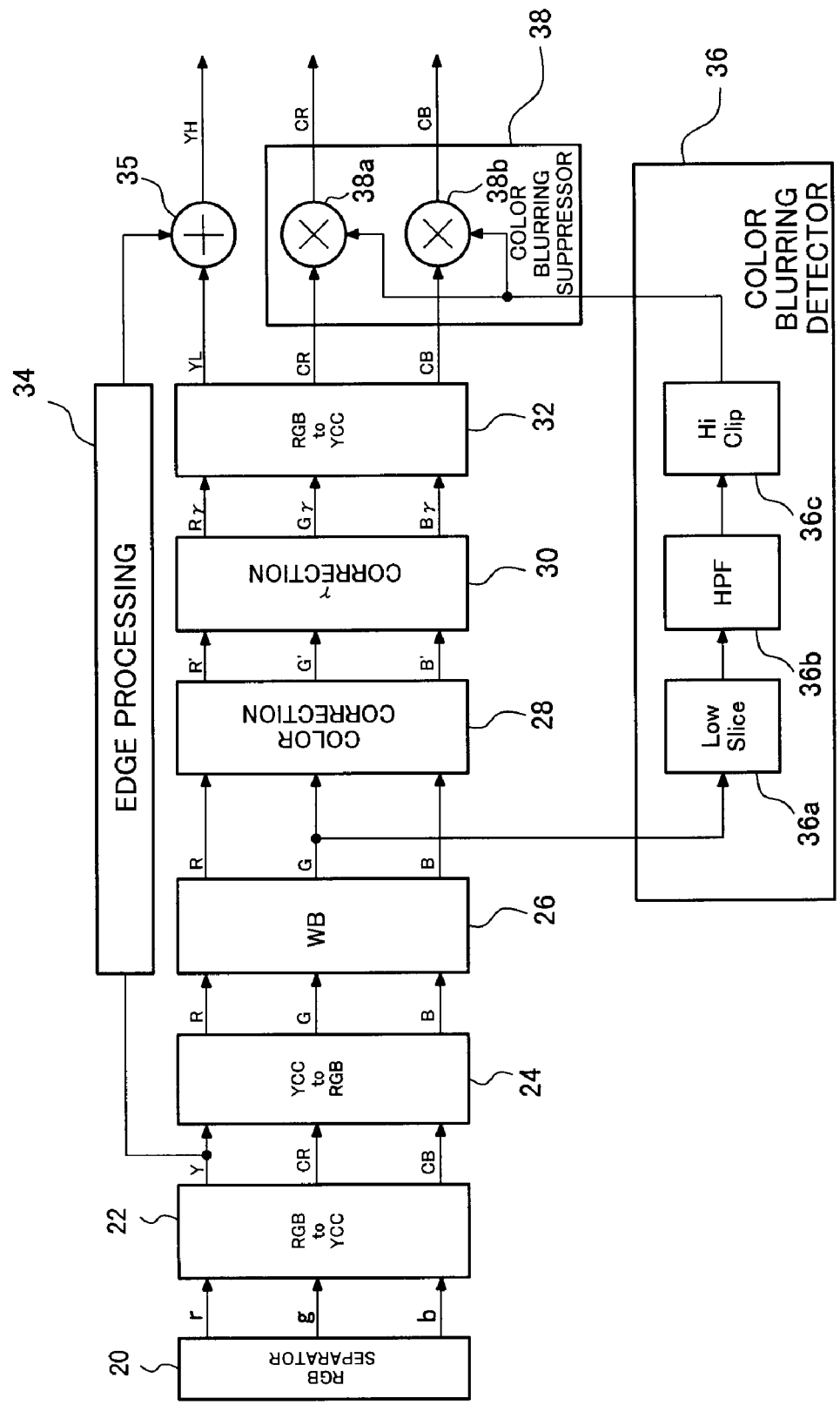
FIG. 2 is a block diagram of a color-blurring detection circuit according to a first embodiment of the present invention.

FIG. 2 shows the configuration of the color-blurring detection circuit 36. As mentioned previously, the color-blurring detection circuit 36 detects occurrence of color-blurring by use of the R, G, and B signals, which are to undergo gamma correction in the γ correction circuit 30, and supplies detected signals to the color-blurring suppressor circuit 38 disposed in the stage subsequent to the γ correction circuit 30. The color-blurring detection circuit 36 is provided in parallel to the γ correction circuit 30, and is provided with an input of the G signal output from the white balance adjustment circuit 26. The reason why color-blurring is detected while taking the G signal as a reference is that the distribution of the R or B signal in the G signal in a high-brightness portion (a highlight portion) is the primary reason for color-blurring. Although color-blurring arises in areas other than the highlight portion, such color-blurring is of low level and does not present any substantial problem in terms of image quality.

The color-blurring detection circuit 36 has a low slice circuit (LowSlice) 36a, a high-pass filter (HPF) 36b, and a high clip circuit (HiClip) 36c. The low slice circuit 36a slices, at a given level, the level of the G signal output from the white balance adjustment circuit 26, and supplies the thus-sliced G signal to the high-pass filter 36b. The high-pass filter 36b extracts only a high-frequency component from the G signal that has undergone low slicing, to thus extract the edge of highlight of the G signal. The high clip circuit 36c clips (cuts) an upper signal from the edge signal of highlight extracted by the high-pass filter 36b, to thus extract only a lower signal. A signal generated by the high clip circuit 36c is a signal used for specifying the edge portion of highlight, and is supplied as a color-blurring detection signal to the color-blurring suppressor circuit 38.

Figure 3:
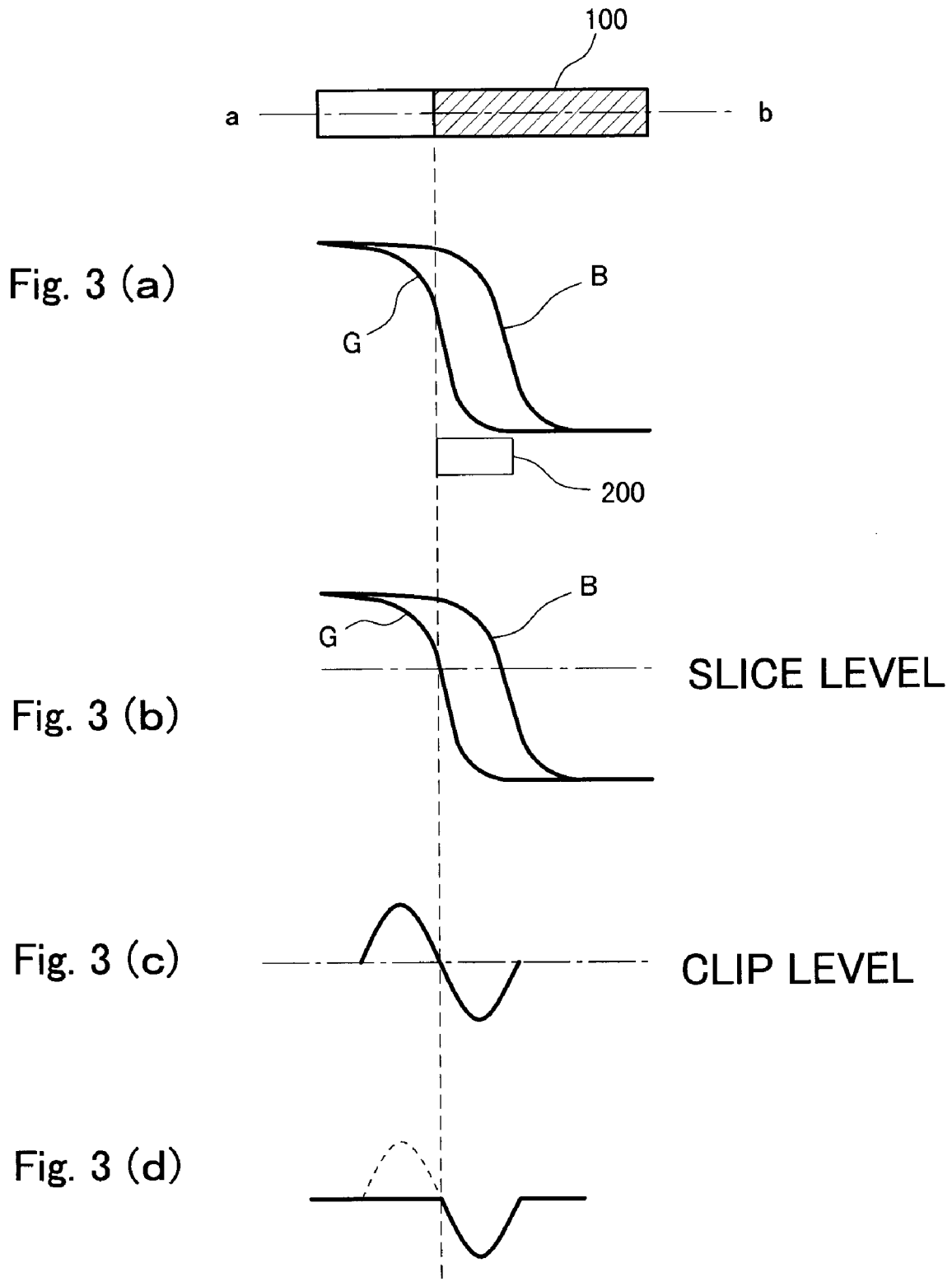
FIGS. 3A to 3D are descriptive views showing processing performed in the configuration shown in FIG. 2.

FIG. 3 shows waveforms of the signals generated by the color-blurring detection circuit 36. FIG. 3A shows the level of the G signal and the level of the B signal with reference to a line ab of a chart 100 that corresponds to a subject. As mentioned above, a difference arises in the distributions of the R, G, and B signals for reasons of axial chromatic aberration and chromatic aberration of magnification. For instance, a great difference arises between the distributions of the G, B signals. The difference between the distributions of the G, B signals appears as color-blurring 200. In the case illustrated in the drawing, a false purple color appears in the edge portion. FIG. 3B shows a slice level used when the G signal is sliced by the low slice circuit 36b. In order to extract the edge portion of highlight, the slice level is set to a given value or more. FIG. 3C shows a signal which has finished passing through the high pass filter 36b, where an upper peak signal and a lower peak signal appear. The upper peak signal fails to accurately reflect an area where color-blurring 200 has arisen, whilst the lower peak accurately reflects an area where color-blurring 200 has arisen. For this reason, as shown in FIG. 3D, the high clip circuit 36c cuts the upper peak (a broken line shows a clipped line), and only the lower peak is output. The signal shown in FIG. 3D is supplied as a color-blurring detection signal to the color-blurring suppressor circuit 38.

As shown in FIG. 2, the color-blurring suppressor circuit 38 has multiplying circuits 38a, 38b. The multiplying circuit 38a multiplies the color difference signal CR output from the brightness color-difference signal generation circuit 32 by the color-blurring detection signal output from the color-blurring detection circuit 36, to thus suppress the color-difference signal CR pertaining to the area where color-blurring has arisen. The multiplying circuit 38b multiplies the color difference signal CB output from the brightness color-difference signal generation circuit 32 by the color-blurring detection signal output from the color-blurring detection circuit 36, to thus suppress the color-difference signal CB pertaining to the area where color-blurring has arisen. Consequently, only the brightness signal exists in the area of color-blurring detected by the color-blurring detection circuit 36, to thus suppress a false color.

Second Embodiment

Figure 4:
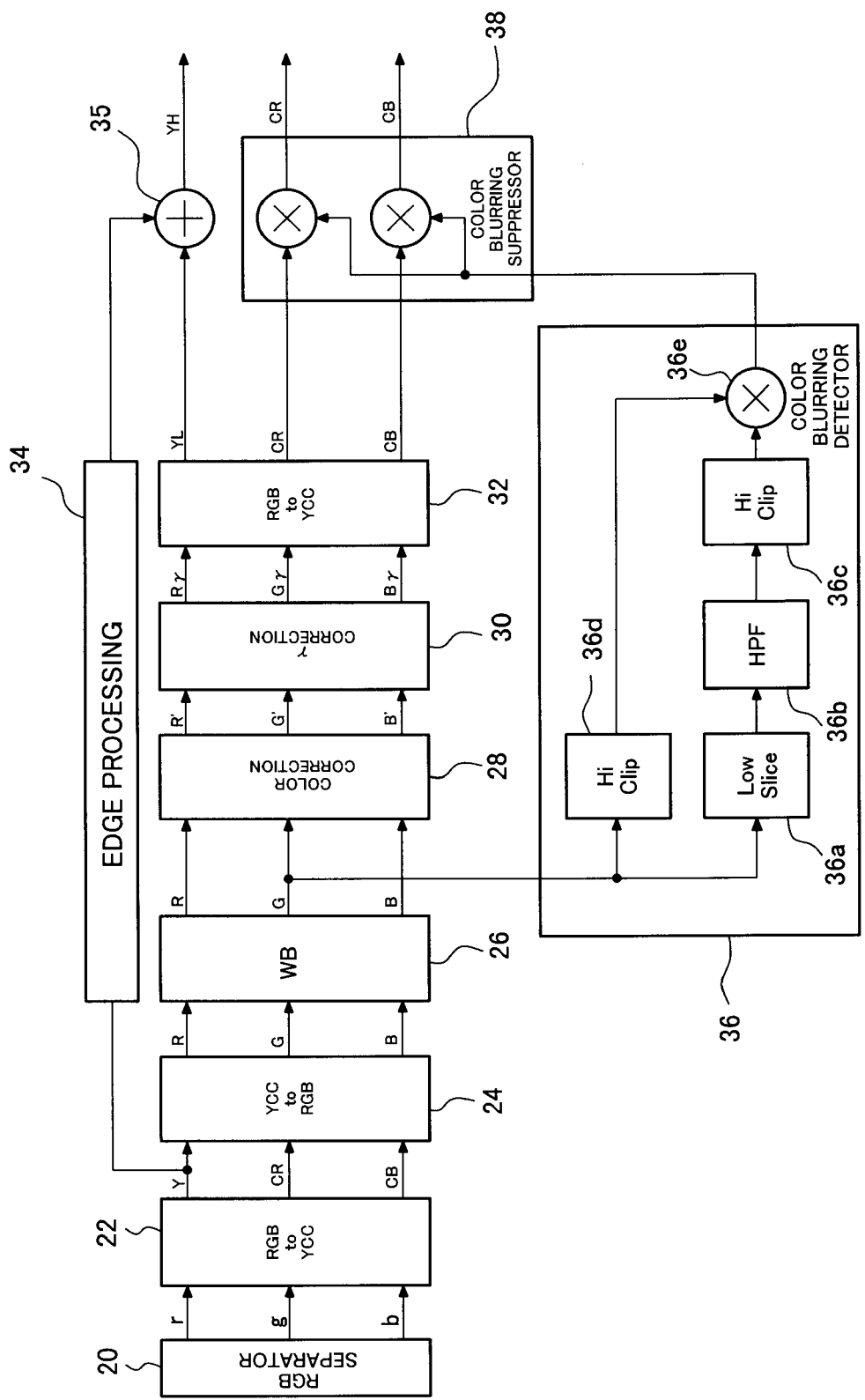
FIG. 4 is a block diagram of a color-blurring detection circuit according to a second embodiment of the present invention.

FIG. 4 shows the configuration of the color-blurring detection circuit (chromatic aberration detection circuit) 36 of a second embodiment. The color-blurring detection circuit 36 shown in FIG. 2 is additionally provided with a high clip circuit 36d and a multiplying circuit 36e. As in the case of FIG. 2, the G signal output from the white balance adjustment circuit 26 is supplied to the low slice circuit 36a, and to the high clip circuit 36d as well.

The high clip circuit 36d clips the high level of the G signal and supplies the thus-clipped signal to the multiplying circuit 36e. The clip level of the high clip circuit 36d is identical with the slice level of the low slice circuit 36a. The multiplying circuit 36e multiplies the G signal clipped by the high clip circuit 36d by the signal (see FIG. 3D) output from the high clip circuit 36c.

When color-blurring of the edge portion of highlight is suppressed, the level of the G signal sometimes does not sufficiently decrease despite color-blurring existing in the edge. Specifically, although the G signal drops discontinuously in the highlight portion, the level of the highlight portion, which has been reduced, still maintains a large value. In such a case, suppressing a color is not preferable. Therefore, the multiplying circuit 36e subjects the signal output from the high clip circuit 36d to multiplication, to thus prevent output of the color-blurring detection signal. In the present embodiment, color-blurring in only the edge portion, where the level of the G signal decreases from a high level to a sufficiently low level, can be said to be suppressed.

Third Embodiment

Figure 5:
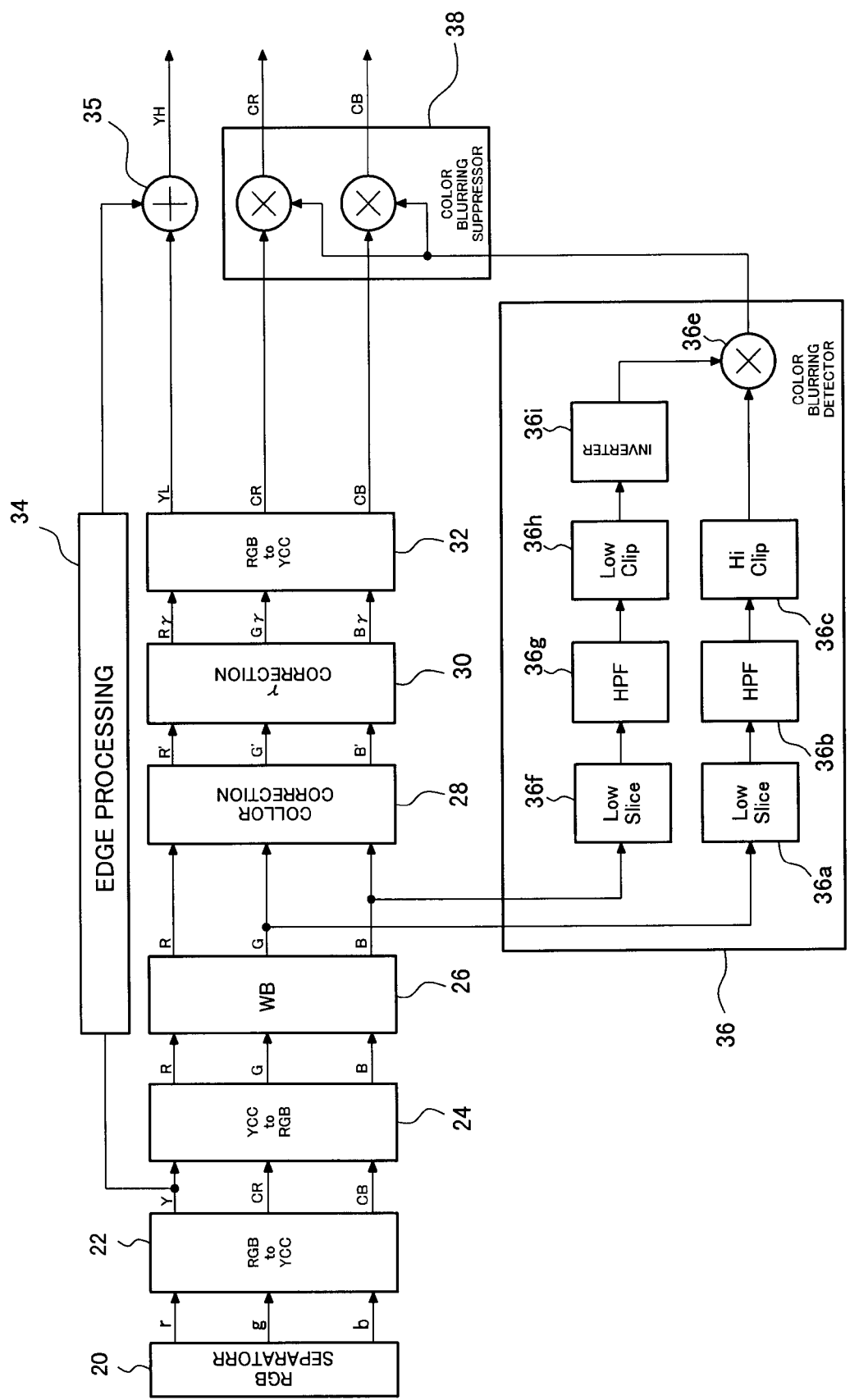
FIG. 5 is a block diagram of a color-blurring detection circuit according to a third embodiment of the present invention.

FIG. 5 shows the configuration of the color-blurring detection circuit (chromatic aberration detection circuit) 36 of a third embodiment. The color-blurring detection circuit 36 shown in FIG. 2 is additionally provided with a low slice circuit 36f, a high-pass filter 36g, a low clip circuit 36h, and an inverter 36i, all of which are intended for processing the B signal, as well as with the multiplying circuit 36e. As in the case of the circuit shown in FIG. 2, the G signal output from the white balance adjustment circuit 26 is supplied to the low slice circuit 36a, and the B signal is supplied to the low slice circuit 36f.

The low slice circuit 36f and the high-pass filter 36g have the same functions as those of the low slice circuit 36a and the high-pass filter 36b, and extract the edge portion of highlight of an input signal. The low slice circuit 36f and the high-pass filter 36g extract the edge portion of highlight of the B signal rather than the edge portion of highlight of the G signal. The high-pass filter 36g supplies the extracted signal to the low clip circuit 36h. The low clip circuit 36h clips (cuts) a lower peak of the input signal, and supplies the thus-cut input signal to the inverter 36i. The low clip circuit 36h clips the input signal with a polarity (on the low level side) differing from the clip polarity (on the high level side) of the high clip circuit 36c. The inverter 36i inverts the input signal, and supplies the thus-inverted signal to the multiplying circuit 36e. The multiplying circuit 36e multiplies the signal output from the high clip circuit 36c by the signal output from the inverter 36i, and supplies a resultant product as a color-blurring detection signal to the color-blurring suppressor circuit 38.

Figure 6:
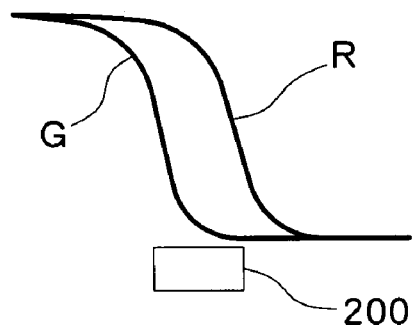
FIGS. 6A to 6E are descriptive views showing processing performed in the configuration shown in FIG. 5.
Figure 6:
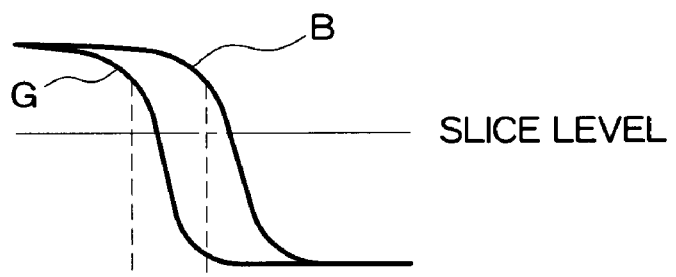
Figure 6:
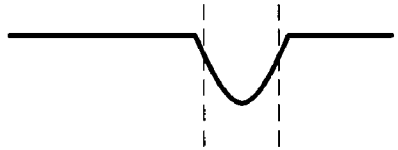

FIG. 6 shows signal waveforms of respective sections of the color-blurring detection circuit. FIGS. 6A and 6B show signal waveforms which are the same as those shown in FIGS. 3A and 3B; namely, the waveforms of the G and B signals. A difference between the distribution of the G signal and the distribution of the B signal appears as color-blurring 200. The low slice circuit 36a subjects the G signal to low slicing at a predetermined slice level. The low slice circuit 36f subjects the B signal to low slicing at the same slice level. FIG. 6C shows the waveform of a signal output from the high-pass filter 36b, and the high clip circuit 36c clips the upper peak of the signal at a predetermined clip level, to thus extract only the lower peak.

FIG. 6D shows the waveform of a signal output from the high-pass filter 36g, and the low clip circuit 36h clips the lower peak of this signal at a predetermined clip level, to thus extract only the upper peak. The inverter 36i inverts the signal waveform shown in FIG. 6D, and the multiplying circuit 36e multiplies the two signals. FIG. 6E shows the waveform of a signal output from the multiplying circuit 36e; namely, the waveform of a signal supplied as a color-blurring detection signal to the color-blurring suppressor circuit 38. As is evident from FIG. 6, in the present embodiment, an overlap between the edge portion of highlight generated from the G signal and the edge portion of highlight generated from the signal B is detected as an area where color-blurring has arisen. Namely, the area sandwiched between the highlight edge of the G signal and the highlight edge of the B signal is detected as the area where color-blurring has arisen. Color-blurring arises for reasons of a difference in the distribution of the G signal and the distribution of the B signal. The color-blurring detection signal is generated from the G and B signals, whereby color-blurring can be suppressed more accurately.

Fourth Embodiment

Figure 7:
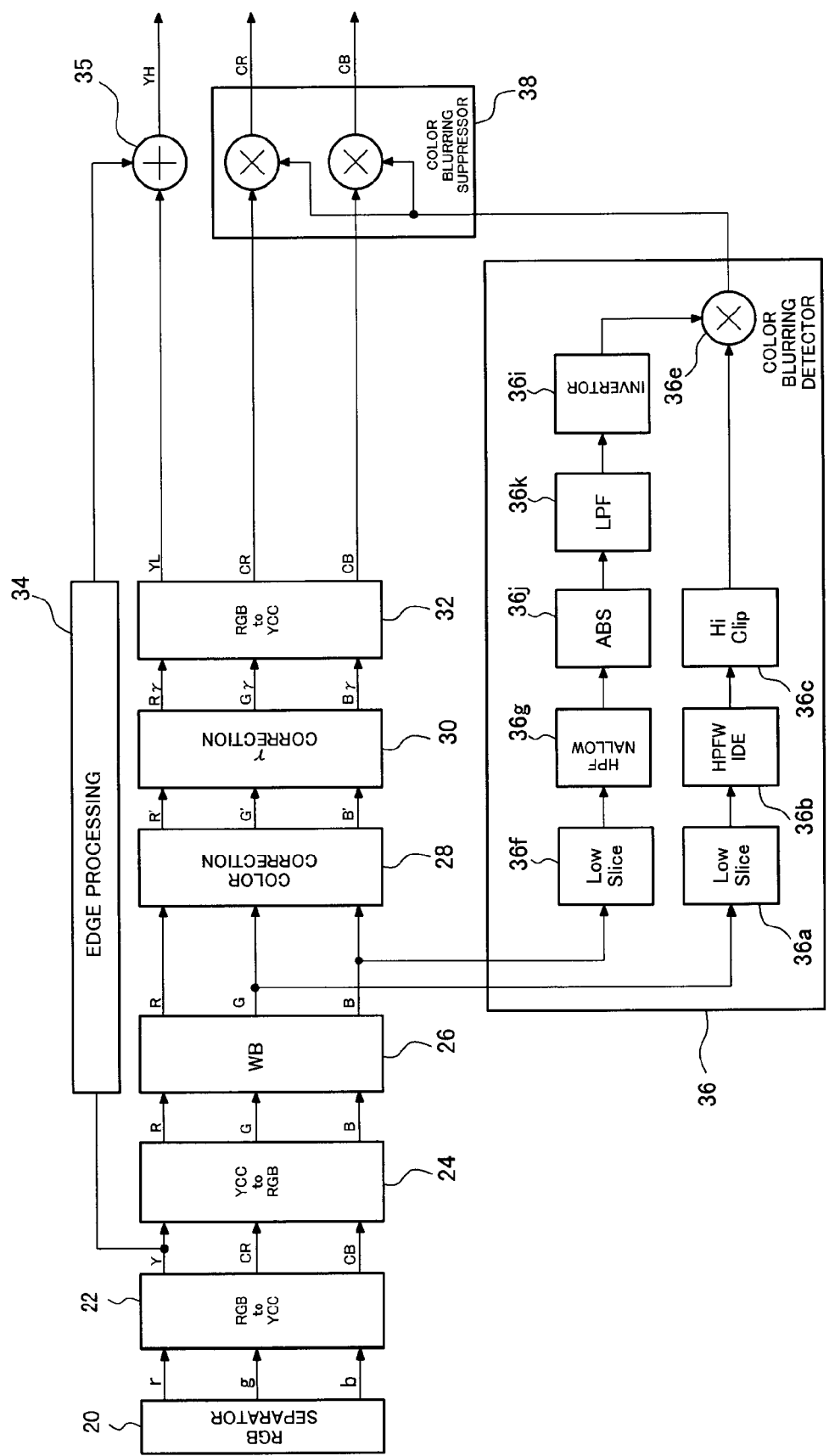
FIG. 7 is a block diagram of a color-blurring detection circuit according to a fourth embodiment of the present invention.

FIG. 7 shows the configuration of the color-blurring detection circuit (chromatic aberration detection circuit) 36 of the present embodiment. In relation to the color-blurring detection circuit 36 shown in FIG. 5, a cutoff frequency characteristic of the high-pass filter 36b and that of the high-pass filter 36g are changed, and the color-blurring circuit 36 is additionally provided with an absolute value circuit (ABS) circuit 36j and a low-pass filter 36k.

The cutoff frequency of the high-pass filter 36b and that of the high-pass filter 36g are different from each other. The high-pass filter 36g extracts only a frequency component which is higher than that extracted by the high-pass filter 36b. The high-pass filter 36g extracts a sharper signal portion of the B signal, and hence can be said to extract a signal narrower than that extracted by the high-pass filter 36b. The absolute value circuit 36j detects the absolute value of the signal extracted by the high-pass filter 36g, and hence the high-frequency signal whose lower peak has been inverted is obtained. The low-pass filter 36k smoothly shapes the waveform of the signal from the absolute value circuit 36j, and supplies the thus-shaped signal to the inverter 36i.

Figure 8:
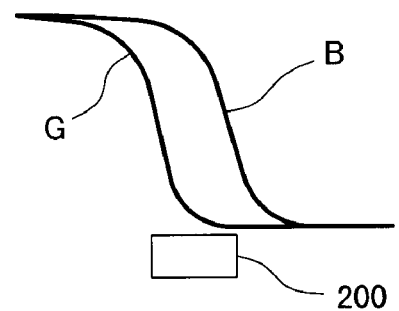
FIGS. 8A to 8F are descriptive views showing processing performed in the configuration shown in FIG. 7.
Figure 8:
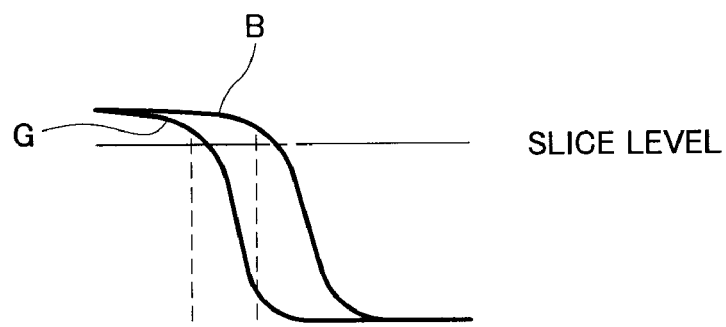
Figure 8:
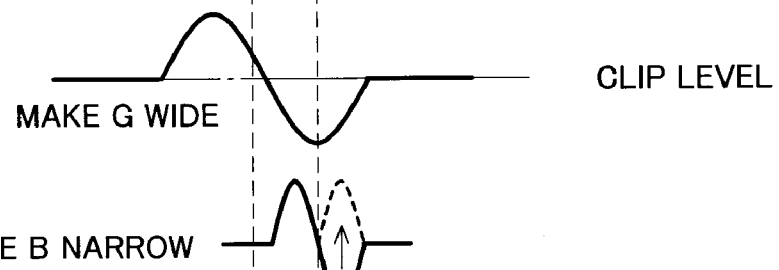
Figure 8:
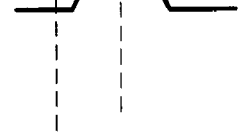
Figure 8:
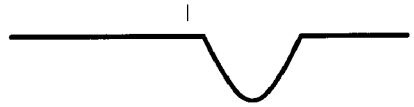

FIG. 8 shows waveforms of the signals appearing in the respective sections of the color-blurring detection circuit 36 of the present embodiment. FIGS. 8A, 8B, and 8C are identical with FIGS. 6A, 6B, and 6C. FIG. 8D shows the waveform of a signal output from the high-pass filter 36g. An edge, which is narrower than the edge of highlight of the G signal, is extracted. The absolute value circuit 36j has the function of inverting the lower peak of this signal to an upper peak. The drawings show inversion by use of a broken line. FIG. 8E shows the waveform of a signal output from the low-pass filter 36k, and a signal corresponds to the signal that has been output from the absolute value circuit 36j and whose waveform has been smoothed. The multiplying circuit 36e multiplies the signal output from the high clip circuit 36c by a signal which is obtained by inverting the signal shown in FIG. 8E, and outputs a product as a color-blurring detection signal.

Even in the present embodiment, as in the case of the third embodiment, an overlap between the edge of highlight of the G signal and that of the B signal is detected as an area where color-blurring has arisen. However, in the present embodiment, the edge of highlight of the B signal can be detected more accurately.

Fifth Embodiment

Figure 9:
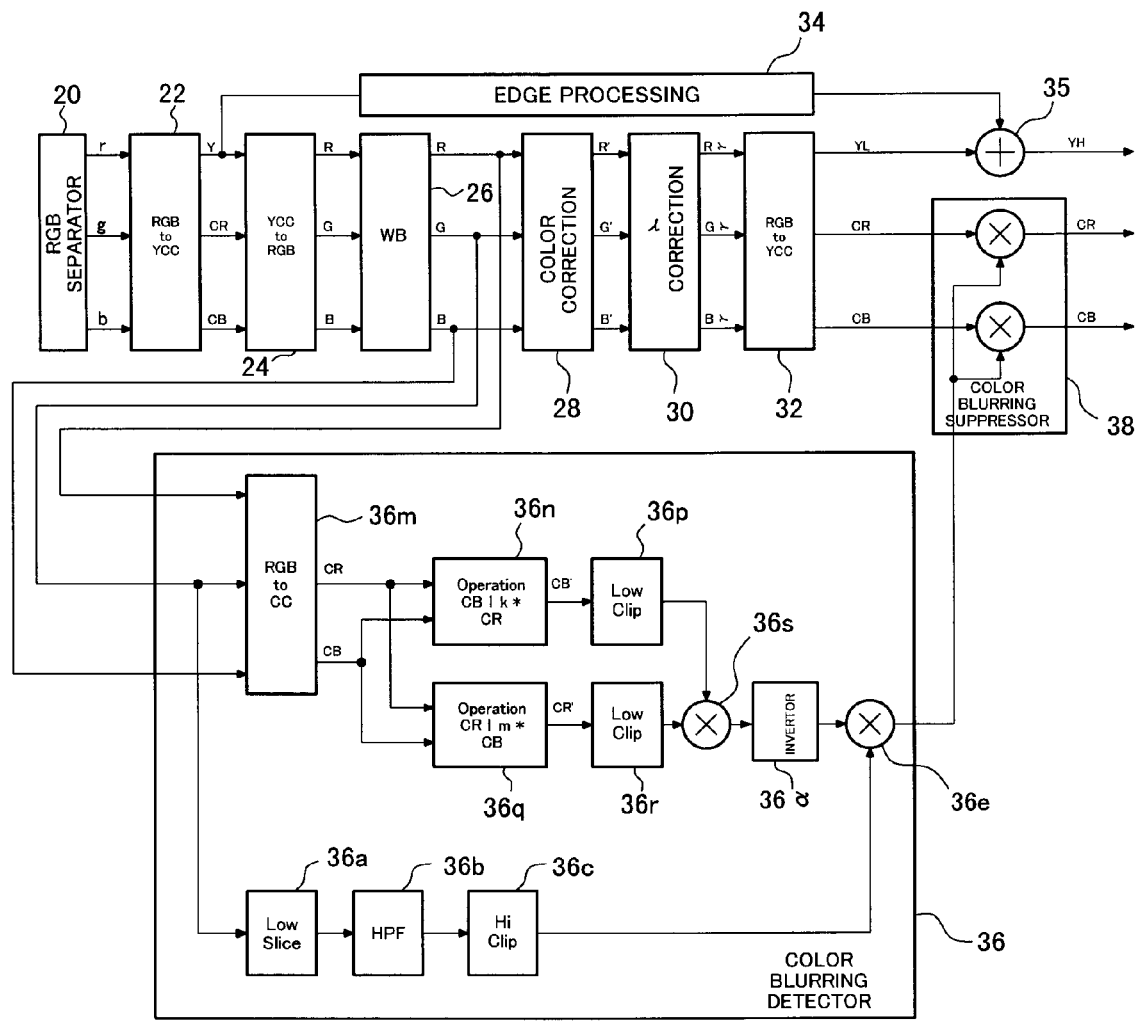
FIG. 9 is a block diagram of a color-blurring detection circuit according to a fifth embodiment of the present invention.

FIG. 9 shows the configuration of the color-blurring detection circuit (chromatic aberration detection circuit) 36 of the present embodiment. Although in the respective embodiments the edge of highlight is detected as an area where color-blurring has arisen, the present embodiment provides a configuration for detecting only a specific color range in the edge of highlight as color-blurring (chromatic aberration).

In FIG. 9, as in the case of the embodiment shown in FIG. 2, the color-blurring detection circuit 36 has the low slice circuit 36a, the high-pass filter 36b, and the high clip circuit 36c. Further, the color-blurring detection circuit 36 has a color-difference signal generation circuit 36m, computing circuits 36n, 36q, low clip circuits 36p, 36r, and multiplying circuits 36s, 36e. As in the case of FIG. 2, the low slice circuit 36a extracts the edge of highlight of the G signal.

The color-difference signal generation circuit 36m generates the color-difference signals CR, CB from the R signal, the B signal, and the G signal, which are output from the white balance adjustment circuit 26, and supplies the thus-generated signals CR, CB to the computing circuits 36n, 36q. The computing circuit 36n performs computation of CB'=CB−k·CR, and supplies a computation result CB' to the low clip circuit 36p. The low clip circuit 36p clips the low level of the input signal CB', and outputs a signal by means of which the input signal CB' becomes positive; namely, a signal satisfying CB'>0. In the meantime, the computing circuit 36q performs computation of CR'=CR−m·CB, and supplies a computation result CR' to the low clip circuit 36r. Likewise the low clip circuit 36p, the low clip circuit 36r also clips the low level of the input signal CR', and outputs a signal by means of which the signal CR' becomes positive; namely, a signal satisfying CR'>0, where "k" and "m" are predetermined parameters. The multiplying circuit 36s multiplies the two signals and supplies a resultant product to the multiplying circuit 36e. Consequently, the multiplying circuit 36s outputs a signal satisfying both CB'>0 and CR'>0. The thus-output signal is inverted by the inverter 36a, and the thus-inverted signal is supplied to the multiplying circuit 36e. The multiplying circuit 36e supplies, to the color-blurring suppressor circuit 38, only a signal satisfying the above conditions, as a color-blurring detection signal, among the signals output from the high clip circuit 36c.

Figure 10:
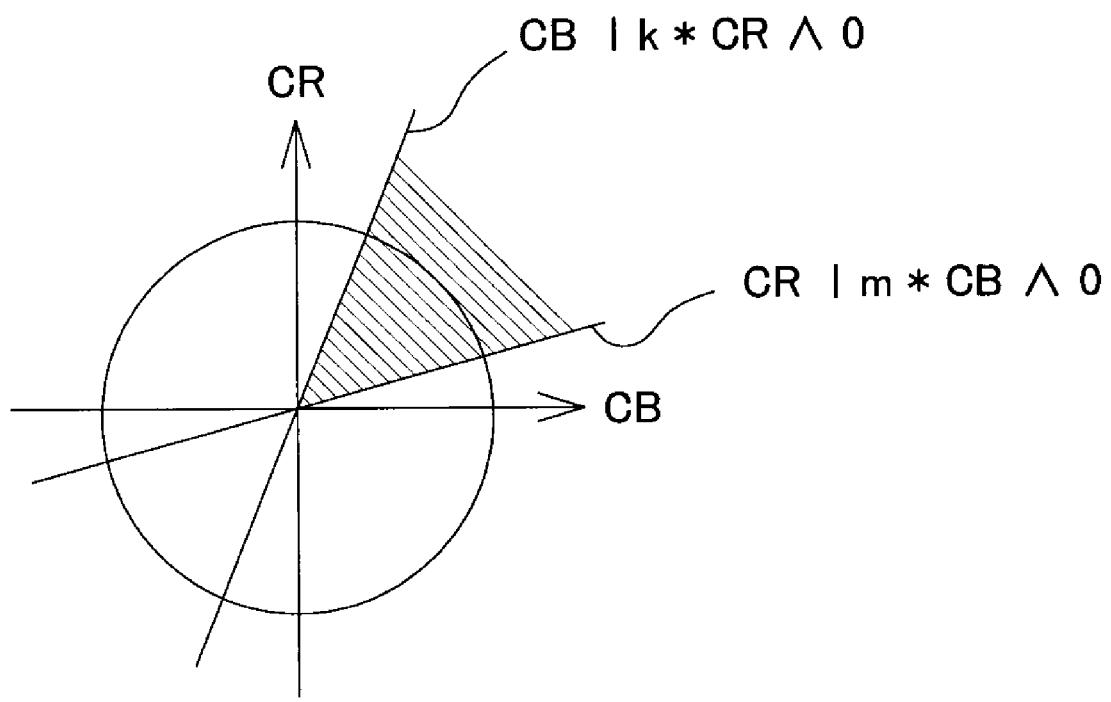
FIG. 10 is a descriptive view showing a color range employed in the configuration shown in FIG. 9.

FIG. 10 shows a color range output as a color-blurring detection signal of the present embodiment. In the color-difference spaces formed from the color-difference signals CB and CR, an overlap (a hatched area in the drawing) between the color range defined by CB−k·CR>0 and the color range defined by CR−m·CB>0 corresponds to the area which is an object of suppression of color-blurring. The color range shown in FIG. 10 corresponds to a magenta area. The color range can be changed in various manners by means of adjusting the parameters "k" and "m." The parameters "k" and "m" can be determined in accordance with the characteristic of an imaging optical system used in a digital camera and stored beforehand in system memory. Moreover, characteristics of the imaging optical system are measured, and default values previously stored in the system memory may be changed according to measured values, to thus perform automatic adjustment. Moreover, values of the parameters "k" and "m" may be manually adjusted by means of the user operating the operation section 54. In this case, the user can select a specific color range where color-blurring is to be suppressed.

Sixth Embodiment

Figure 11:
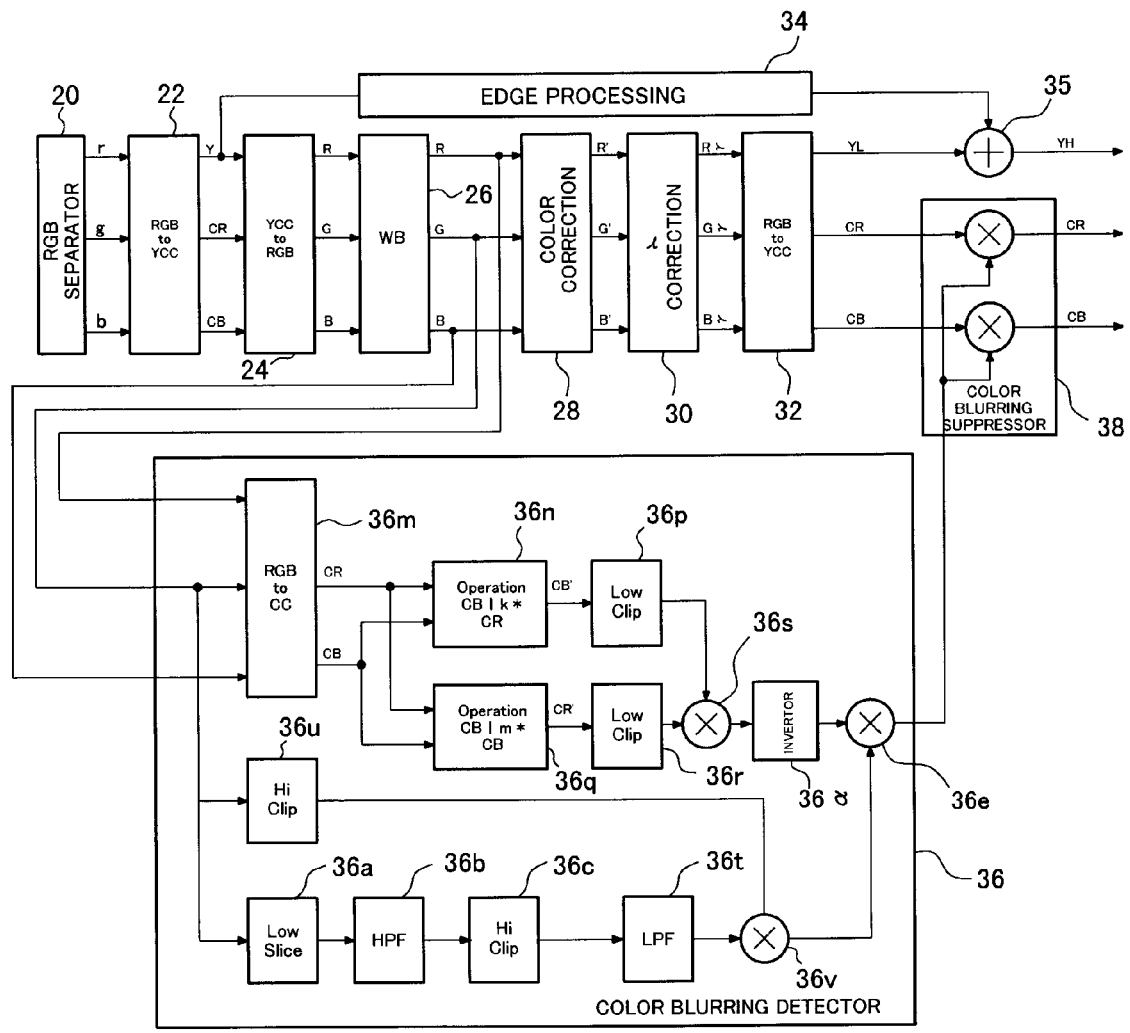
FIG. 11 is a block diagram of a color-blurring detection circuit according to a sixth embodiment of the present invention.

FIG. 11 shows the configuration of the color-blurring detection circuit (chromatic aberration detection circuit) 36 of the present embodiment. This configuration corresponds to the configuration realized by means of additionally providing the color-blurring detection circuit 36 shown in FIG. 9 with a low-pass filter 36t and a multiplying circuit 36v, which are provided in a stage subsequent to the high clip circuit 36c; and adding a high clip circuit 36u in parallel to the low slice circuit 36a. The high clip circuit 36u and the multiplying circuit 36v have the same functions as those of their counterparts in the configuration of the second embodiment shown in FIG. 4. Only when the level of the G signal has been sufficiently decreased by the edge of highlight, a color-blurring detection signal is generated. The lower-pass filter 36t is for smoothing a signal output from the high clip circuit 36c, and may be omitted as in the case of the circuit shown in FIG. 4.

Seventh Embodiment

Figure 12:
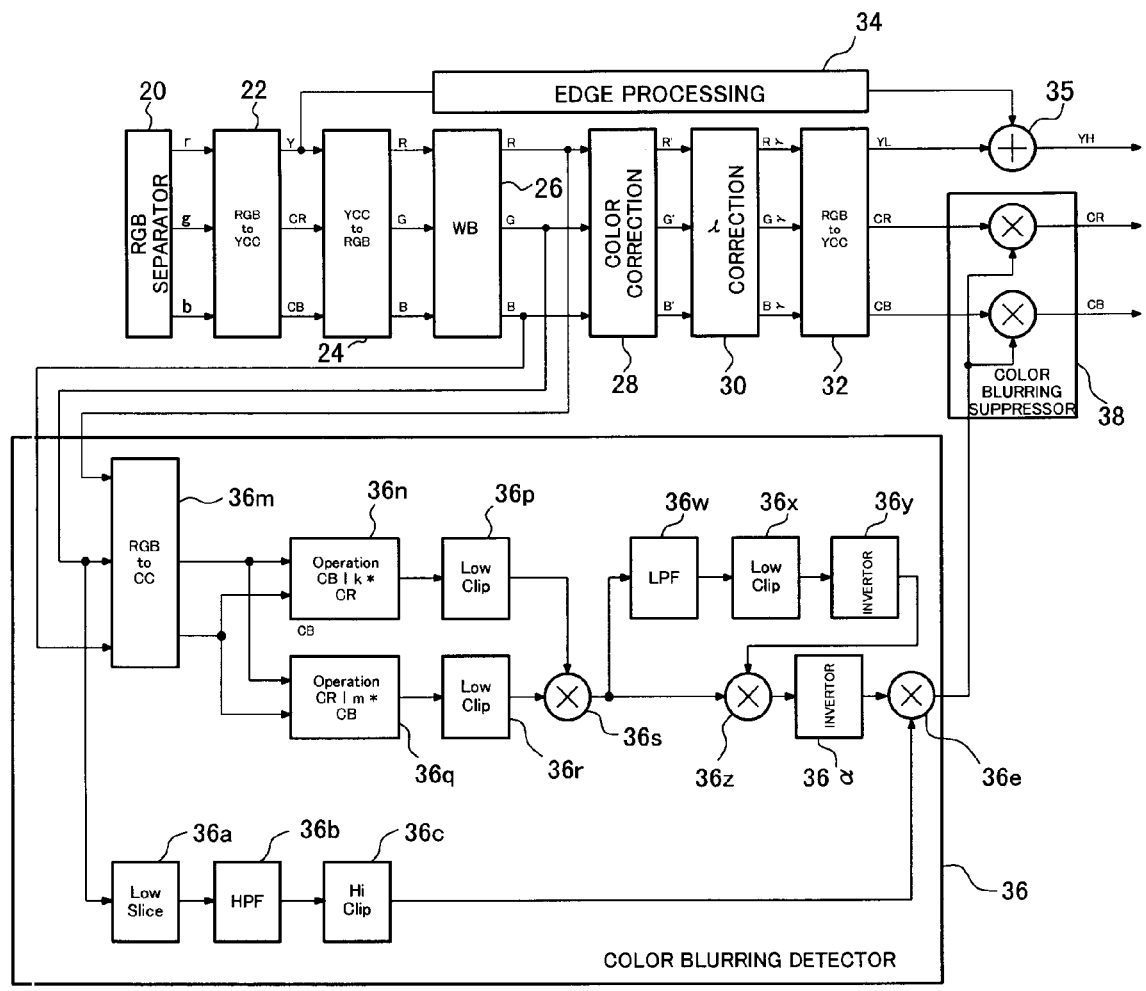
FIG. 12 is a block diagram of a color-blurring detection circuit according to a seventh embodiment of the present invention.

FIG. 12 shows the configuration of the color-blurring detection circuit (chromatic aberration detection circuit) 36 of the present embodiment. This configuration corresponds to the configuration realized by means of additionally providing the color-blurring detection circuit 36 shown in FIG. 9 with a low-pass filter 36w, a low-clip circuit 36x, inverters 36y, 36α, and a multiplying circuit 36z. The color-blurring detection circuit 36 shown in FIG. 9 detects a specific color range as an object of detection. In the present embodiment, the color-blurring detection circuit 36 detects only a specific color range whose width is narrow and smaller than a predetermined value, as an object of detection. The reason for this is that, when the width of the color range is greater than the predetermined value; namely, when the color range exists continuously, the color range is deemed to originally exist in a captured image and not to be a false color. This color range is excluded from the object of suppression of color-blurring.

The signal output from the multiplying circuit 36s is divided into two signals. One is supplied to the multiplying circuit 36z, and the other is supplied to the low-pass filter 36w, the low clip circuit 36x, and the inverter 36y. A signal output from the inverter 36y is supplied to the multiplying circuit 36z, where the two signals are multiplied. A signal output from the multiplying circuit 36z is inverted by the inverter 36α, and the thus-inverted signal is supplied to the multiplying circuit 36e. Namely, among the signals output from the multiplying circuit 36s, only the signal including a signal component processed by the low-pass filter 36w or the like is supplied as a color-blurring detection signal to the color-blurring suppressor circuit 38.

Figure 13:
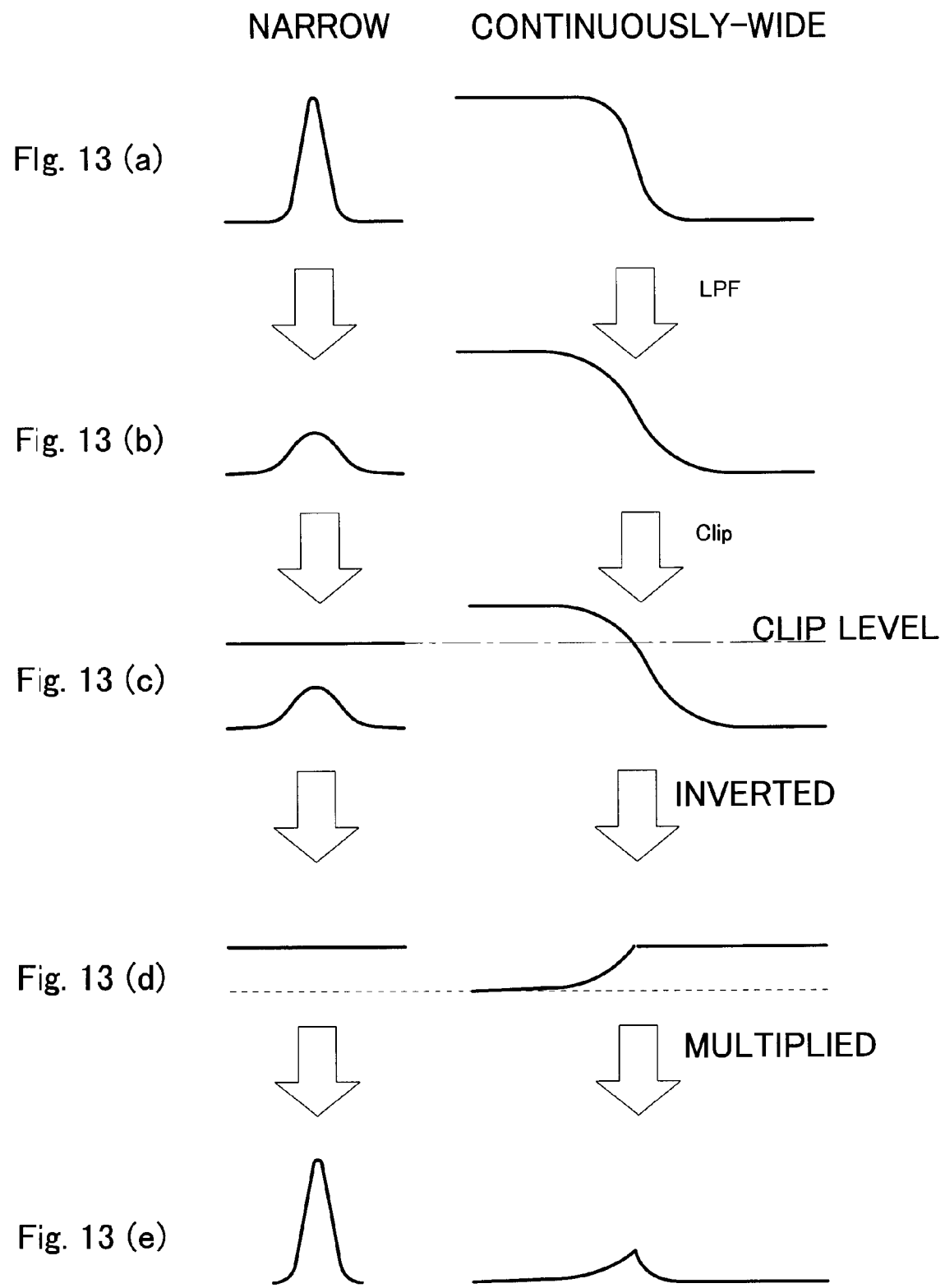
FIGS. 13A to 13E are descriptive views showing processing performed in the configuration shown in FIG. 12.

FIG. 13 shows waveforms of respective signals output from respective sections; namely, the low-pass filter 36w, the low clip circuit 36x, the inverter 36y, and the multiplying circuit 36z, when the width of the specific color range signal is different (i.e., when the signal width is narrow and when the signal width is continuously thick). FIG. 13A shows the waveform of a signal output from the multiplying circuit 36s, and shows in a comparative manner the case where the signal width is narrow and the case where the signal width is thick. When the specific color range is taken as magenta, the signal waveform output from the multiplying circuit 36s can be considered to be the signal waveform of magenta. FIG. 13B shows the waveform of a signal output from the low-pass filter 36w. FIG. 13C shows a clip level of the low clip circuit 36x. When the width of the specific color range signal is narrow, the level of the input signal becomes lower than the clip level. Further, when the width of the specific color range signal is continuously thick, a portion of the signal higher than the clip level is clipped. FIG. 13D shows the waveform of a signal output from the inverter 36y. When the width of the specific color range signal is narrow, the signal has a constant level (a signal into which a zero-level signal has been inverted). When the width of the specific color range signal is continuously thick, the signal assumes the inverted waveform of a clipped signal. FIG. 13E shows the waveform of a signal output from the multiplying circuit 36z; namely, the wave form of a signal obtained by multiplying the signal shown in FIG. 13A by the signal shown in FIG. 13D. When the width of the specific color range signal is narrow, a peak level signal is obtained. However, the width of the specific color range signal is continuously thick, the level of the signal becomes low. The signal shown in FIG. 13E is inverted by the inverter 26a, and the thus-inverted signal is supplied to the multiplying circuit 36e. Consequently, when the specific color range signal is narrow, an output is produced as a color-blurring detection signal. When the specific color range signal is continuously thick, a color-blurring detection signal is not output (a value showing color-blurring is not output), and the color-blurring suppressor circuit 38 does not suppress the color-difference signals.

As mentioned above, in the present embodiment, color-blurring is suppressed only when the width of the specific color range signal becomes equal to or smaller than a predetermined value, whereby unnecessary removal of a color can be prevented. A signal width, which is an object of detection, can be adjusted (increased or decreased) by the clip level of the low clip circuit 36x.

Eighth Embodiment

Figure 14:
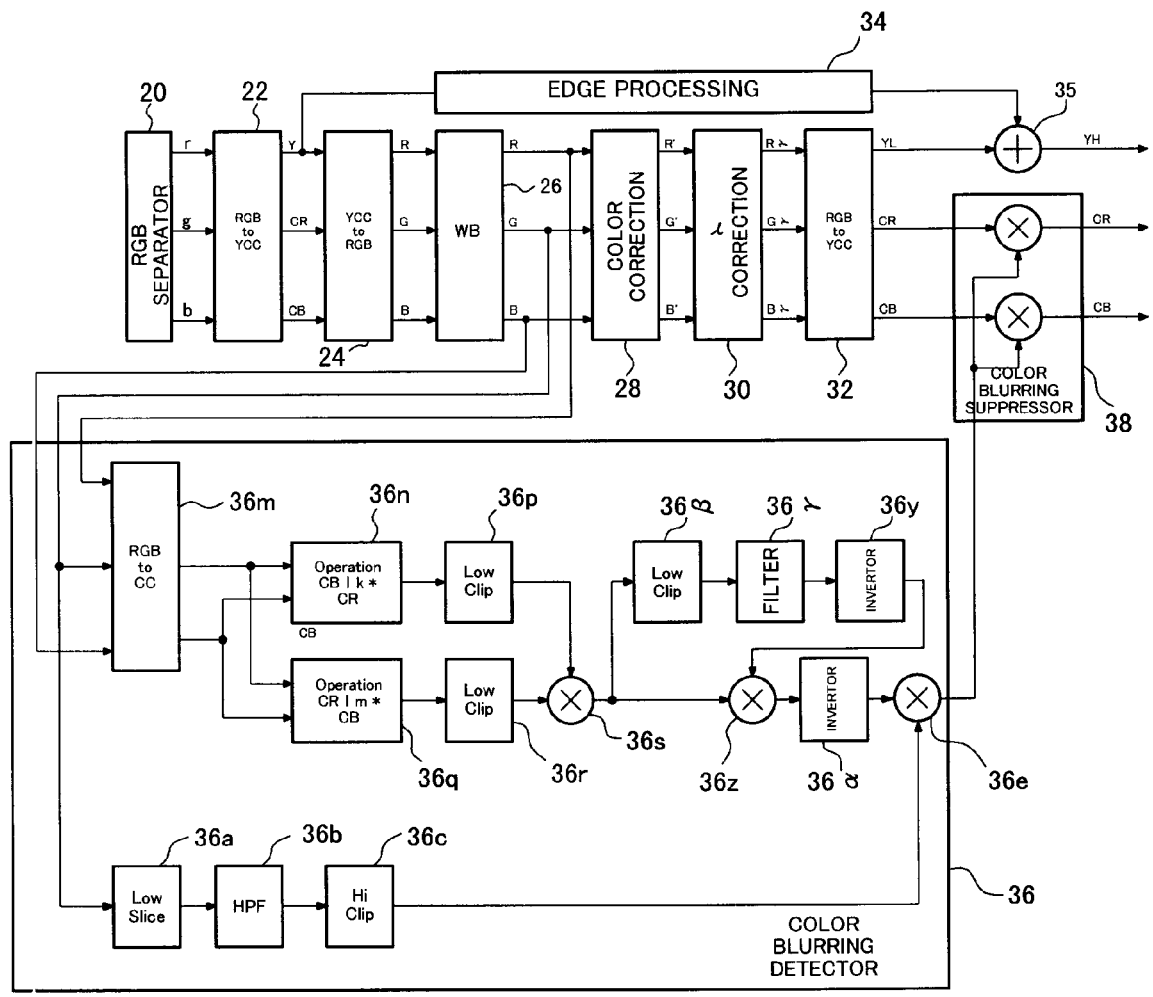
FIG. 14 is a block diagram of a color-blurring detection circuit according to an eighth embodiment of the present invention.

FIG. 14 shows the configuration of the color-blurring detection circuit (chromatic aberration detection circuit) 36 of the present embodiment. As in the embodiment shown in FIG. 12, the present embodiment relates to a case where only a signal having a certain predetermined value or less is detected from among the specific color range signals. This configuration corresponds to the configuration realized by means of additionally providing the color-blurring detection circuit 36 shown in FIG. 12 with a low clip circuit 36β which is a replacement of the low-pass filter 36w, and a filter 36γ which is a replacement of the low clip circuit 36x. The low clip circuit 36β clips a low level of the signal output from the multiplying circuit 36s, and supplies the thus-clipped signal to the filter 36γ. The filter 36γ is a low-pass filter which eliminates a high-frequency component and supplies a resultant signal to the inverter 36y.

Figure 15:
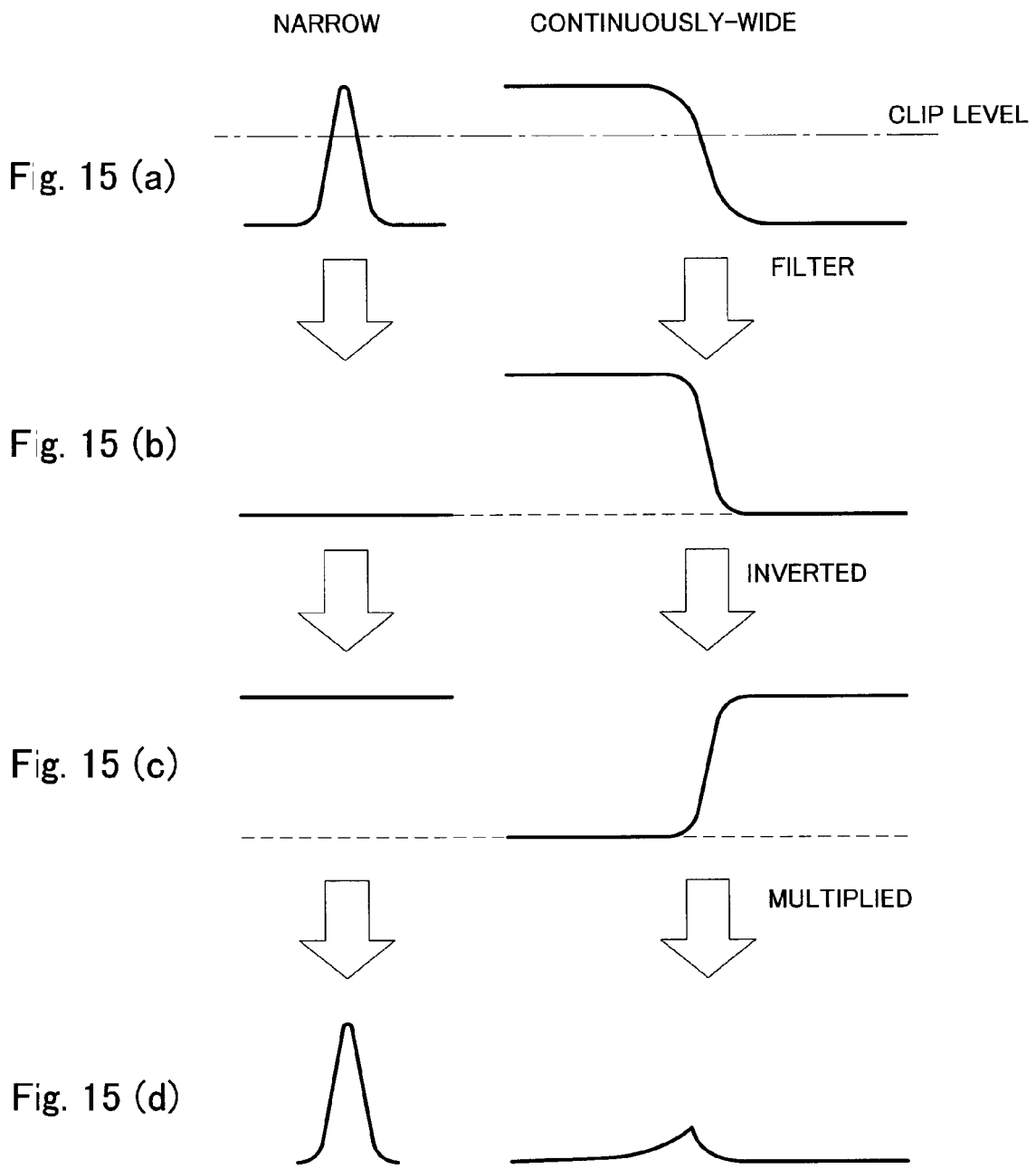
FIGS. 15A to 15D are descriptive views showing processing performed in the configuration shown in FIG. 14.

FIG. 15 shows waveforms of signals from the respective sections shown in FIG. 14, showing in a comparative manner a signal waveform having a narrow width and a signal waveform which is continuously thick. FIG. 15A shows a clip level of the low clip circuit 36β. The level of the signal lower than the clip level is clipped (cut). FIG. 15B shows the waveform of a signal output from the filter 36γ. When the width of the signal waveform is narrow, the remaining signal is eliminated by the low clip circuit 36β. FIG. 15C shows the waveform of a signal output from the inverter 36γ. FIG. 15D shows the waveform of a signal output from the multiplying circuit 36z; that is, the waveform of a product between the signal waveform shown in FIG. 15A and the signal waveform shown in FIG. 15C. When the signal waveform is narrow, a peak signal is obtained. However, when the signal is continuously thick, the signal assumes a low level. In the case of a continuously-thick signal waveform, a color-blurring detection signal is not output (a value showing color-blurring is not output). The color-blurring suppressor circuit 38 does not suppress the color-difference signals.

Ninth Embodiment

Figure 16:
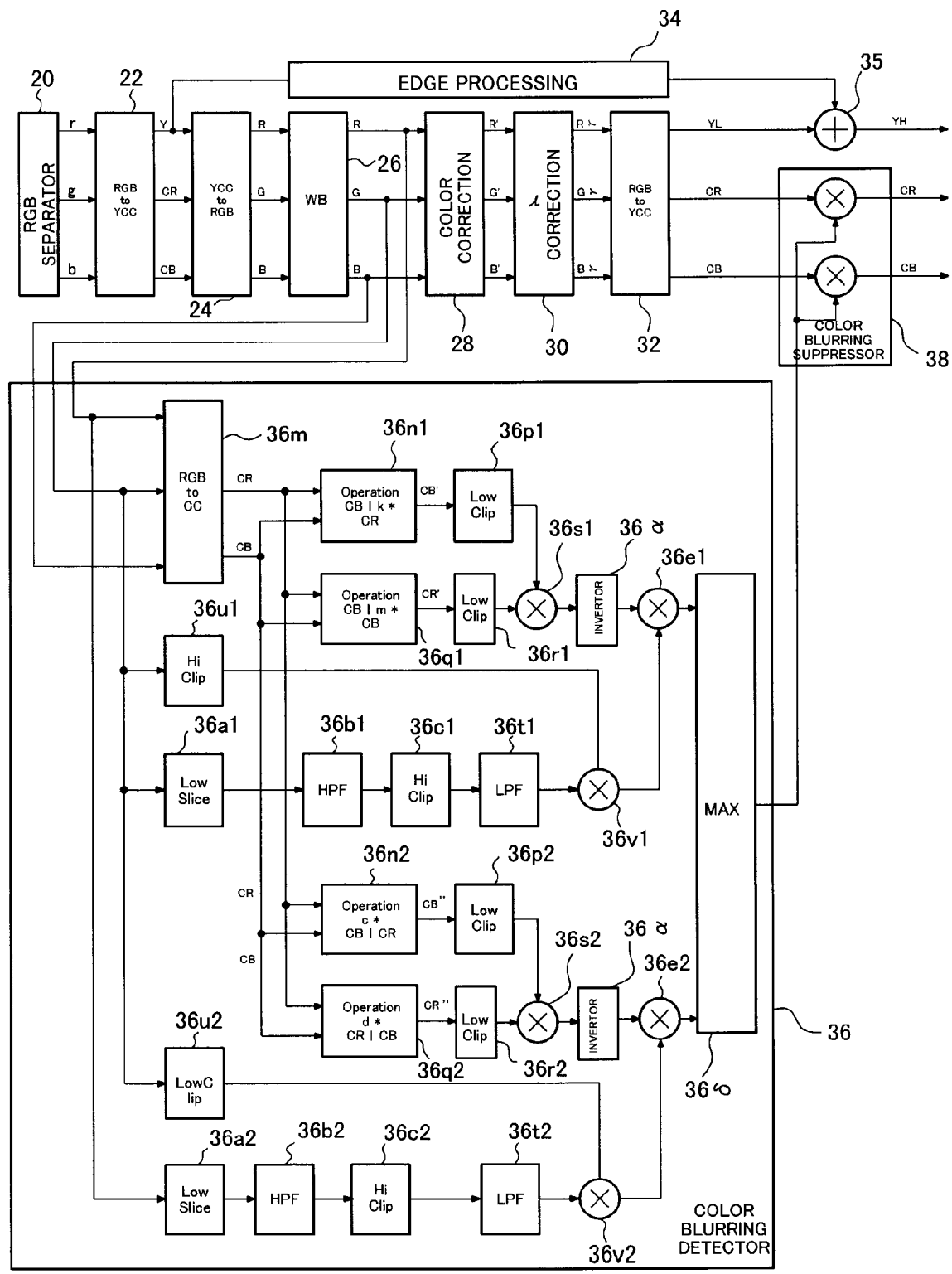
FIG. 16 is a block diagram of a color-blurring detection circuit according to a ninth embodiment of the present invention.

FIG. 16 shows the configuration of the color-blurring detection circuit (chromatic aberration detection circuit) 36 of the present embodiment. This configuration corresponds to the configuration realized by means of employing multiple copies of the color-blurring detection circuit 36 shown in FIG. 11. In the circuit shown in FIG. 11, the color range of magenta is suppressed. However, in the present embodiment, the color range of magenta and the color range of cyan are suppressed. Namely, a low slice circuit 36a1, a high-pass filter 36b1, a high clip circuit 36c1, a low-pass filter 36t1, a high clip circuit 36u1, a color-difference signal generation circuit 36m, computing circuits 36n1, 36q1, low clip circuits 36p1, 36r1, and multiplying circuits 36s1, 36e1, 36v1 are identical with their counterparts in the configuration shown in FIG. 11. Moreover, the configuration is additionally provided with a low slice circuit 36a2, a high-pass filter 36b2, a high clip circuit 36c2, a low-pass filter 36t2, a low clip circuit 36u2, computing circuits 36n2, 36q2, low clip circuits 36p2, 36r2, multiplying circuits 36s2, 36e2, 36v2, and a maximum value circuit (MAX) 366.

Figure 17:
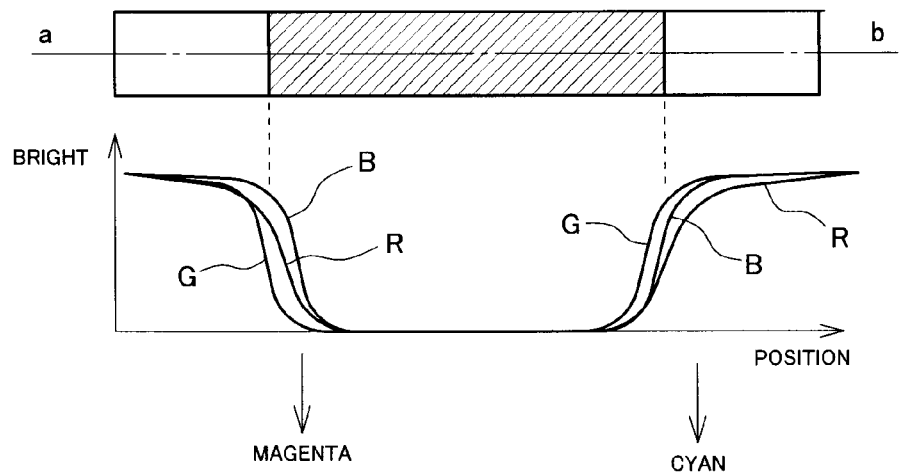
FIG. 17 is a descriptive view showing occurrence of color-blurring in an edge of a highlight.

The low slice circuit 36a2, the high-pass filter 36b2, the high clip circuit 36c2, the low-pass filter 36t2, the low clip circuit 36u2, the low clip circuits 36p2, 36r2, and the multiplying circuits 36s2, 36e2, and 36v2 are basically identical in function with the low slice circuit 36a1, the high-pass filter 36b1, the high clip circuit 36c1, the low-pass filter 36t1, the high clip circuit 36u1, the low clip circuits 36p1, 36r1, and the multiplying circuits 36s1, 36e1, 36v1. The low clip circuit 36u2 is different from the high clip circuit 36u1, to thus clip the high level of the G signal. The reason for this is that the computing circuit 36n2 or the like specifies the color range of cyan. However, as is evident from the chart of the subject shown in FIG. 17 and the distribution of the R signal, the distribution of the G signal, and the distribution of the B signal, which are obtained when the subject has been captured, cyan arises in a high-brightness area of the edge of highlight. In contrast, magenta arises in a low-brightness area of the edge of highlight. Therefore, the high clip circuit 36u1 clips a high level. The R signal rather than the G signal is supplied to the low slice circuit 36a2, to thereby extract the edge of highlight of the R signal. The reason why the R signal rather than the G signal is used is that cyan arises for reasons of a difference between the distribution of the B signal and the distribution of the R signal as shown in FIG. 17, and cyan arises in the edge of highlight of the R signal.

As in the case of FIG. 11, by means of the multiplying circuit 36e1, a signal satisfying both CB'>0 and CR'>0 among the signals output from the high clip circuit 36c1 is supplied to the maximum value circuit 366. In the meantime, the computing circuits 36n2, 36q2 perform computation of CB"=c·CB−CR, and supply a computation result CB" to the low clip circuit 36p2. The low clip circuit 36p2 clips a low level of the input signal CB", and outputs a signal which renders CB' positive; namely, a signal satisfying CB">0. The computing circuit 36q2 performs computation of CR"=d·CR−CB, and supplies a computation result CR" to the low clip circuit 36r2. As does the low clip circuit 36p2, the low clip circuit 36r2 clips a low level of the input signal CR", and outputs a signal which renders CR" positive; namely, a signal satisfying CR">0. Here, "c" and "d" are predetermined parameters. The multiplying circuit 36s2 multiplies the two signals, and supplies a product to the multiplying circuit 36e2. Consequently, the multiplying circuit 36s2 outputs a signal satisfying both CB"<0 and CR">0. Among the signals output from the high clip circuit 36c2, only the signal satisfying the above conditions is supplied from the multiplying circuit 36e2 to the maximum circuit 366. The maximum value circuit 366 selects the larger one of the signals, and supplies the thus-selected signal as a color-blurring detection signal to the color-blurring suppressor circuit 38.

Figure 18:
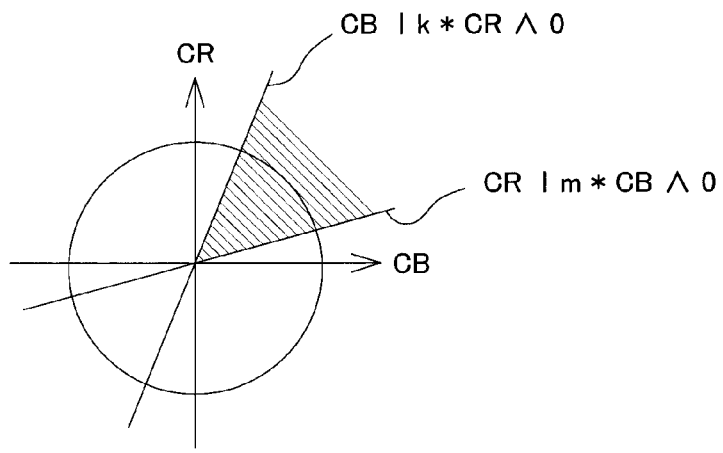
FIG. 18A is a descriptive view showing a color range (magenta) employed in the configuration shown in FIG. 16.
FIG. 18B is a descriptive view showing a color range (cyan) employed in the configuration shown in FIG. 16.
Figure 18:
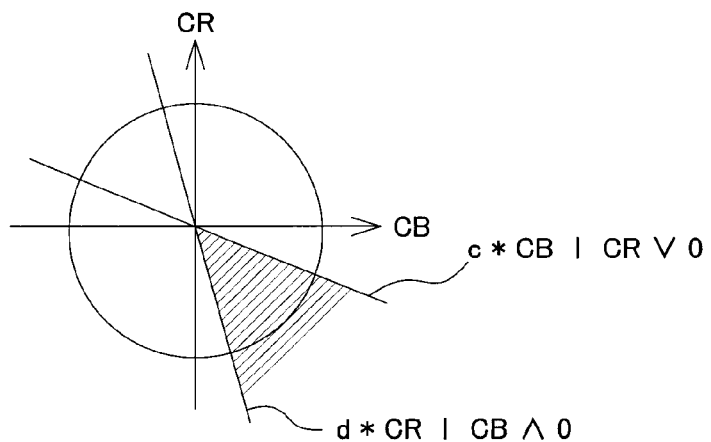

FIGS. 18A and 18B show color ranges specified by the computing circuits 36n1, 36q1, 36n2, and 36q2 of the present embodiment. FIG. 18 shows the color ranges specified by the computing circuits 36n1, 36q1, which corresponds to magenta. FIG. 18B is a color range specified by the computing circuits 36n2, 36q2, which corresponds to cyan. In the present embodiment, of magenta arising in the low bright side of the edge of highlight and cyan arising in the high bright side of the edge of highlight, whichever color has a higher level, can be suppressed. As a matter of course, the maximum value circuit 366 may be replaced by the addition circuit to thus suppress both magenta and cyan.

The configuration shown in FIG. 16 can also have only the color-difference signal generation circuit 36m, the computing circuits 36n2, 36q2, the low clip circuits 36p2, 36r2, the multiplying circuits 36s2, 36e2, 36v2, the low slice circuit 36a2, the high-pass filter 36b2, the high clip circuit 36c2, and the low-pass filter 36t2; generate the color-difference signals CB, CR from the R, G, and B signals; detect the edge of highlight of the R signal; and detect color-blurring corresponding to cyan. This configuration corresponds to the configuration shown in FIG. 11 where cyan is detected in place of magenta. In short, there may be adopted any one of the configuration for detecting only color-blurring of magenta, the configuration for detecting only color-blurring of cyan, and the configuration for detecting color-blurring of both magenta and cyan.

Tenth Embodiment

Figure 19:
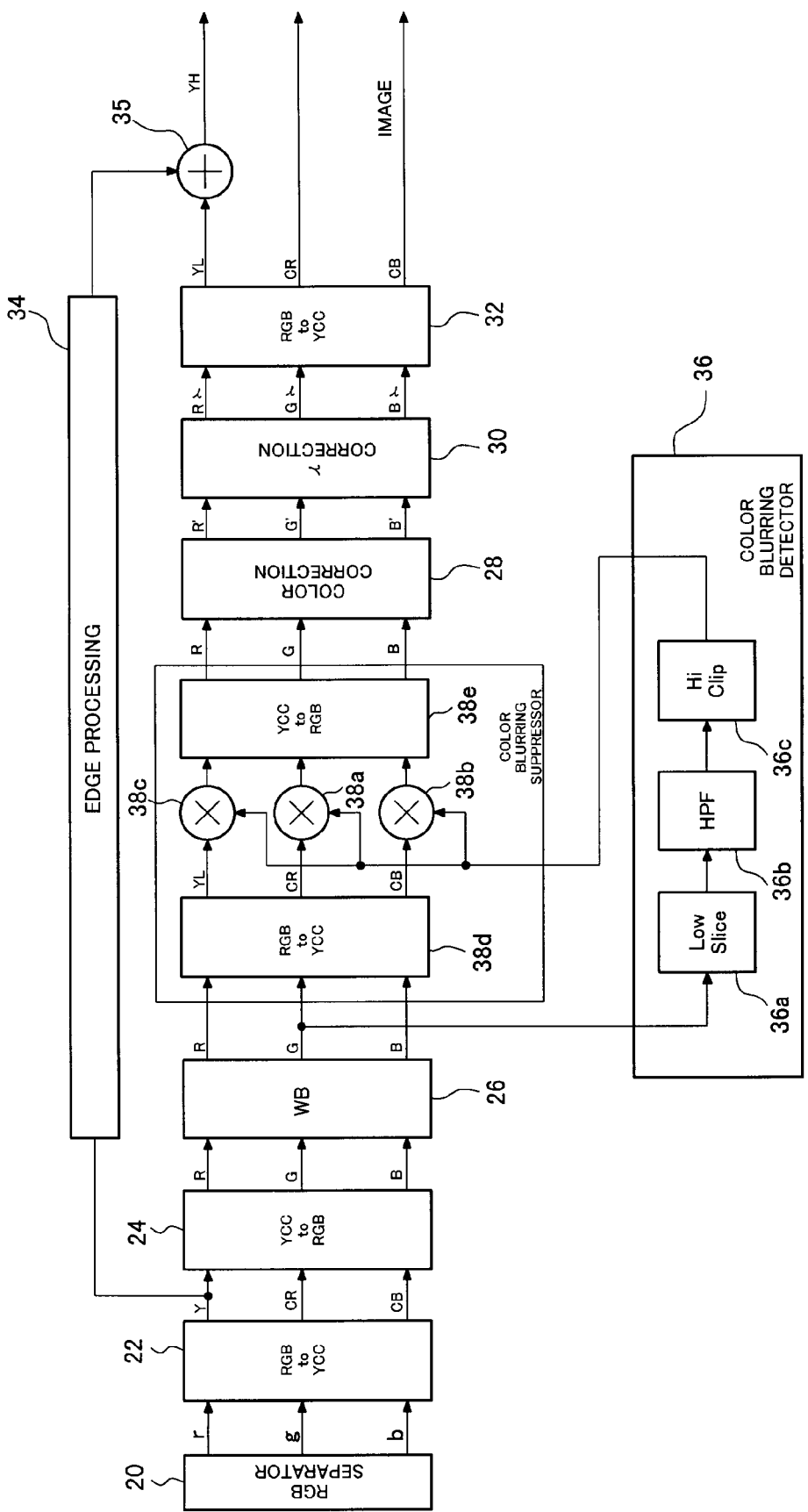
FIG. 19 is a block diagram showing an entire digital camera according to a tenth embodiment of the present invention.

FIG. 19 shows the configuration of a digital camera according to the present embodiment. The present embodiment differs from the embodiment shown in FIG. 1 in that the color suppressor circuit 38 is disposed prior to gamma correction rather than subsequent to gamma correction. As described in connection with the first embodiment, when color-blurring (chromatic aberration) is suppressed before gamma correction, there arises a problem of an area whose color-blurring has been suppressed by gamma correction becoming gray. To solve the problem, in the present embodiment, when color-blurring is suppressed before gamma correction, a brightness signal is also corrected, to thus prevent occurrence of a graying problem, which would otherwise be caused by gamma correction.

In FIG. 19, the color suppressor circuit 38 is interposed between the white balance adjustment circuit 26 and the color correction circuit 28. The color suppressor circuit 38 has the multiplying circuits 38a, 38b, 38c, a brightness color-difference signal generation circuit 38d, and an RGB signal generation circuit 38e. The brightness color difference signal generation circuit 38d generates the brightness signal Y and the color-difference signals CB, CR from the R, G, and B signals output from the white balance adjustment circuit 26; and supplies the thus-generated signals to the multiplying circuits 38a, 38b, and 38c. As do the multiplying circuits 38a, 38b of the color suppressor circuit 38 shown in FIG. 3, the multiplying circuits 38a, 38b multiply the color-difference signals CR, CB by the color-blurring detection signal, to thus render the color-difference signals zero (i.e., identical in level with the R, G, and B signals). In the meantime, the multiplying circuit 38c multiplies the brightness signal by the color-blurring detection signal, to thus suppress the brightness signal. The multiplying circuits 38a, 38b, and 38c supply their computation results to the RGB signal generation circuit 38e. The RGB generation circuit 38e again generates the R, G, and B signals from the brightness signal Y and the color-difference signals CB, CR; and supplies the thus-generated signals to the color correction circuit 28.

The configuration of the color-blurring detection circuit 36 is identical with that of the color-blurring detection circuit 36 shown in FIG. 3.

As mentioned above, in the present embodiment, the color-difference signals CB, CR are corrected to thus suppress color-blurring. Concurrently, the level of the brightness signal Y is corrected as well. Hence, even when the brightness signal has been subjected to gamma correction performed by the subsequent γ correction circuit 30, the brightness of the brightness signal does not increase, nor does the brightness signal become gray.

Figure 20:
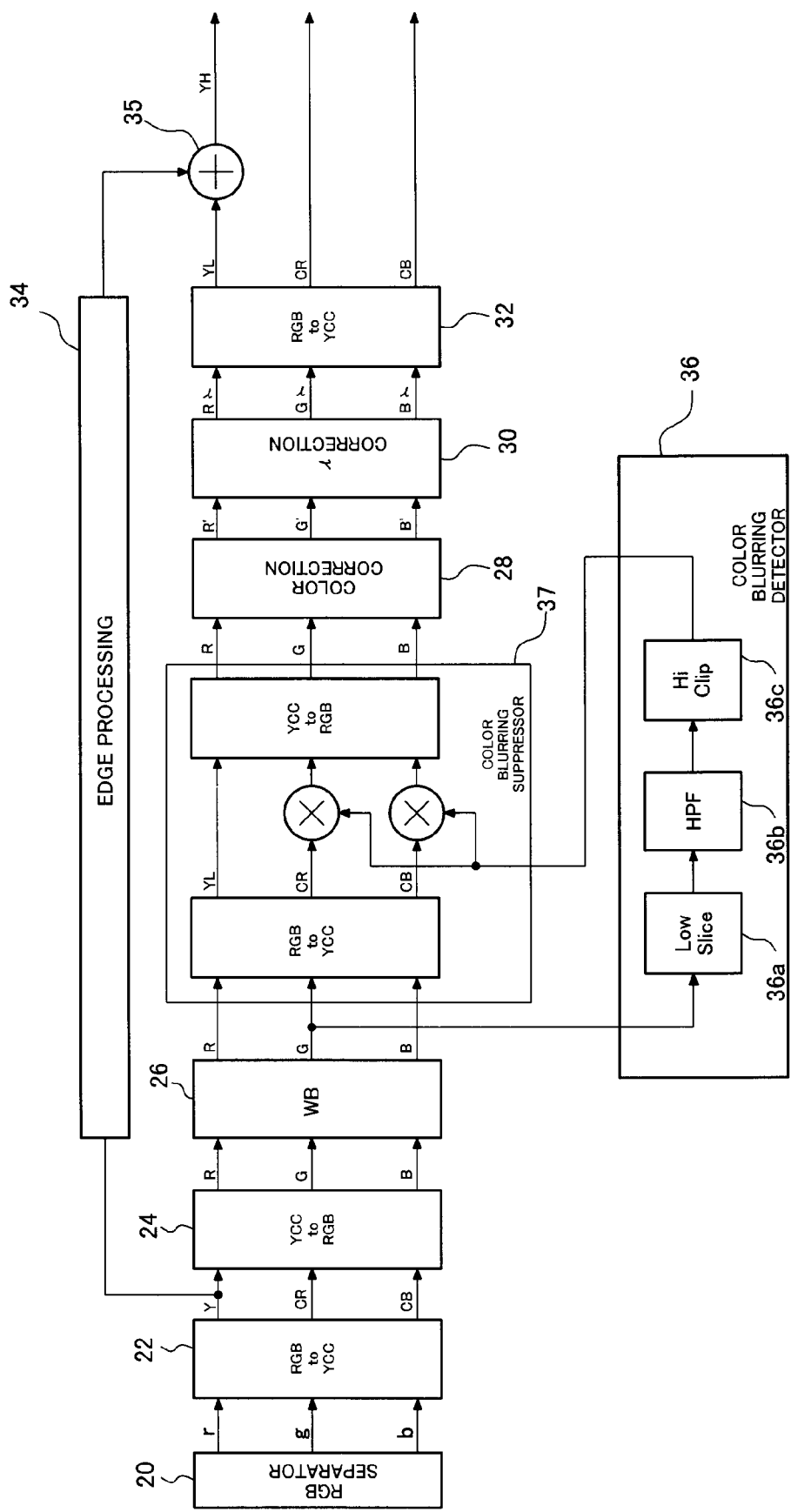
FIG. 20 is a block diagram of an entire digital camera, showing a comparative example of the tenth embodiment.

FIG. 20 shows a comparative example for the present embodiment. As in the case of the embodiment shown in FIG. 19, the example refers to the case where color-blurring is suppressed before gamma correction. In contrast with the color-blurring suppressor circuit 38 shown in FIG. 19, the color-blurring suppressor circuit 37 does not have the multiplying circuit 38c, and does not correct the brightness signal Y. In this case, color-blurring can be suppressed by correcting the color-difference signals CB, CR. However, since the brightness signal Y remains in its present form, the levels of the R, G, and B signals are left unchanged. By means of subsequent gamma correction, the levels of the R, G, and B signals increase, and hence the brightness signal becomes gray.

Figure 21:
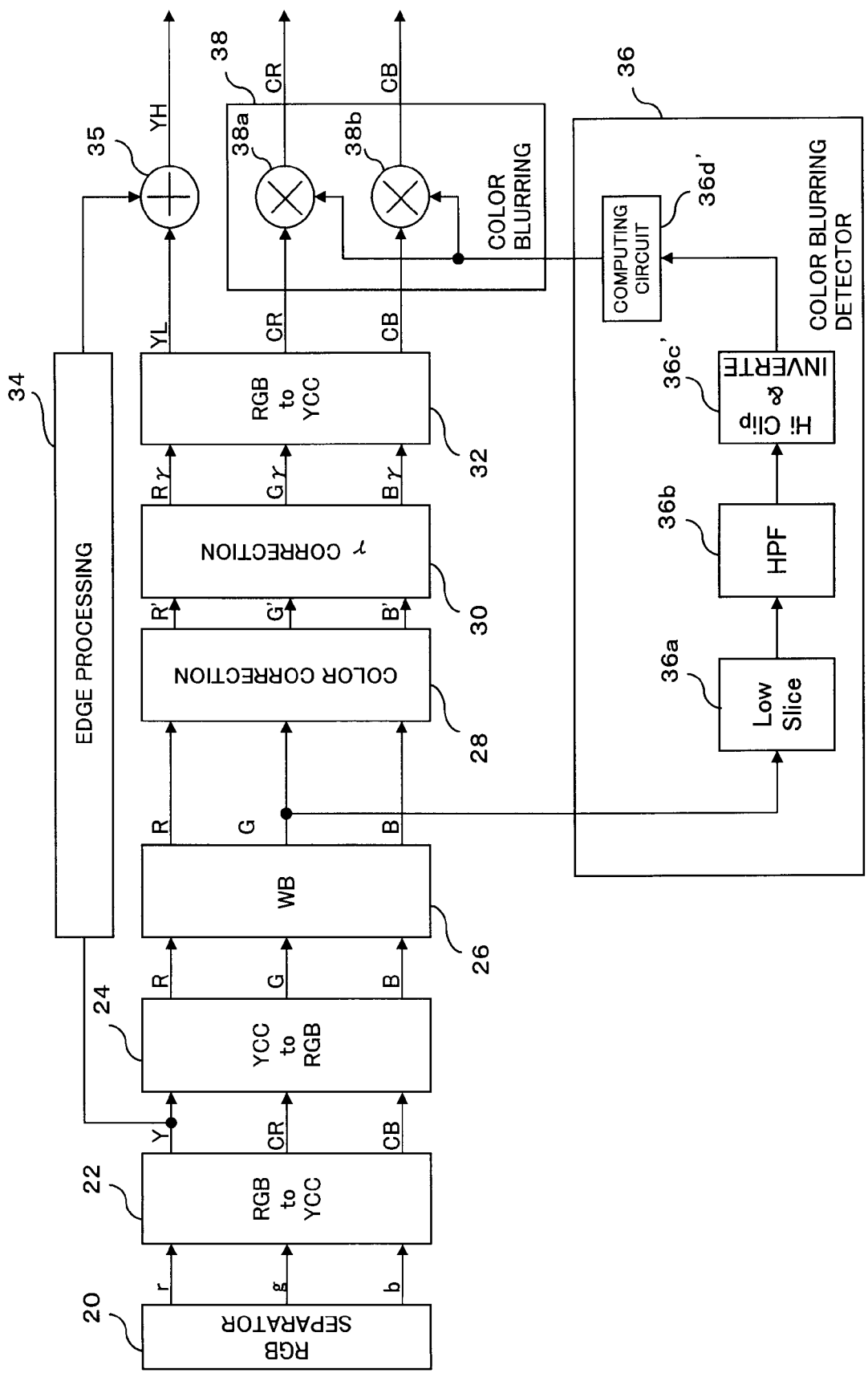
FIG. 21 is a block diagram of a color-blurring detection circuit according to still another embodiment of the present invention.

As above, the embodiments of the present invention have been described. However, the present invention is not limited to them and may be implemented in another form. For instance, the color-blurring detection circuit 36 provided in the configuration shown in FIG. 2 has the high clip circuit 36c. However, the high clip circuit can be replaced with another circuit. FIG. 21 shows the color-blurring detection circuit 36 of another configuration. In contrast with the configuration shown in FIG. 2, the high clip circuit 36c is replaced with the high-clip-and-inversion circuit 36c' and the computing circuit 36d'. The high-clip-and-inversion circuit 36' subjects the signal output from the high pass filter 36b to high clipping; inverts the signal, which has undergone high clipping, by use of a predetermined conversion table; and outputs the thus-inverted signal. The computing circuit 36d' subjects the signal S output from the high-clip-and-inversion circuit 36c' to computation of 1-S, and supplies a result as a color-blurring detection signal to the color-blurring suppressor circuit 38.

Figure 22:
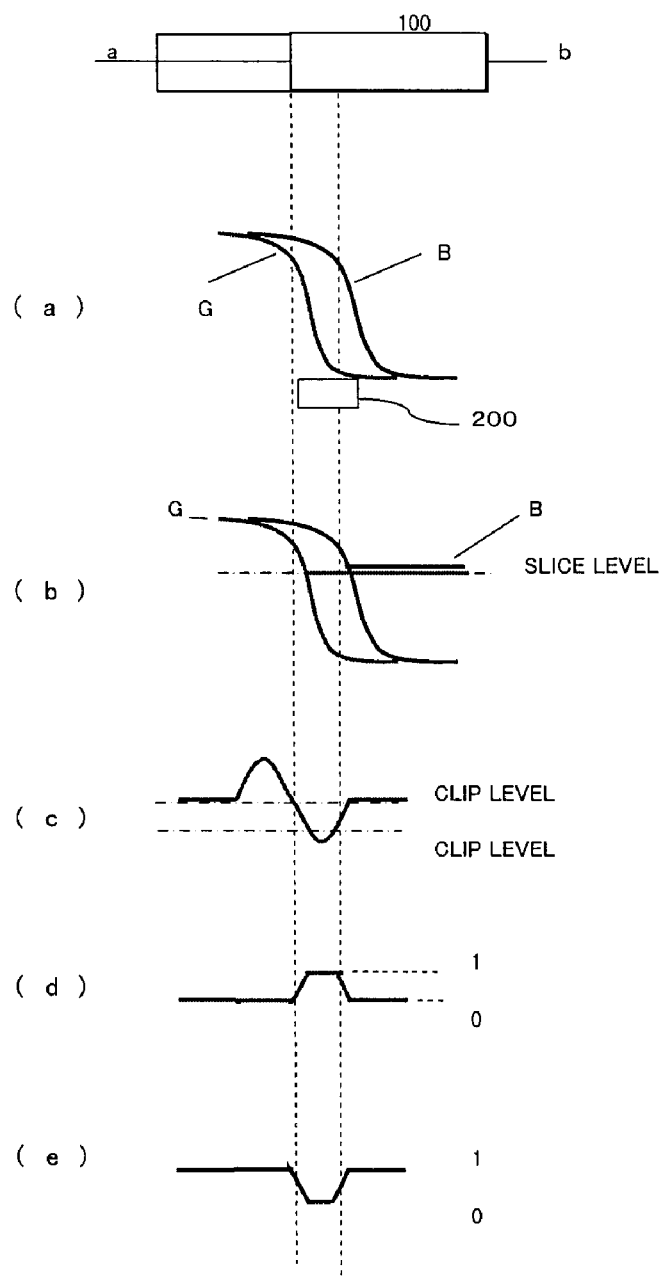
FIGS. 22A to 22E are descriptive views showing processing performed in the configuration shown in FIG. 21.

FIG. 22 shows the waveform of a signal having the configuration shown in FIG. 21, which corresponds to FIG. 3.

Figure 23:
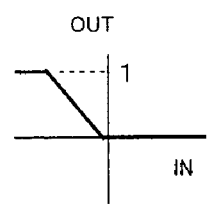
FIG. 23 is a descriptive view showing a weighting coefficient used in a clip-and-inverter circuit.

FIG. 22B shows the waveform of a signal output from the high-clip-and-inversion circuit 36c'. As shown in FIG. 22C, the high-clip-and-inversion circuit 36c' performs high clipping and low clipping operations at two clip levels, and inverts the resultant signals. The high-clip-and-inversion circuit 36c' can also simultaneously performs clipping and inversion by use of a predetermined weighting function. FIG. 23 shows a weighting function used for simultaneously effecting clipping and inversion. In FIG. 23, the horizontal axis represents an input level, and the vertical axis represents an output level. The function operates as follows: namely, a numeral 1 is output until the input level becomes a constant negative level; the output level gradually becomes smaller until an input level of 0; when the input level is 0, the output level becomes 0; and, if the input level is positive, the output level becomes 0. From FIG. 23, high clipping, low clipping, and inversion are understood to be performed simultaneously. FIG. 22E shows the waveform of a signal output from the computing circuit 36d'. This signal waveform is 1-S with respect to the signal waveform shown in FIG. 22D (on the assumption that this signal is taken as S). The signal shown in FIG. 22E is supplied to the color-blurring suppression circuit 38, where color-blurring included in the color-difference signals is suppressed. Specifically, chromatic aberration is eliminated from the area of the signal shown in FIG. 22E where the level assumes a value of 0, to thus eliminate a false color. Likewise, the high clip circuit 36c shown in FIGS. 4, 5, 7, 9, 11, 12, 14, and 19 and the high clip circuits 36c1, 36c2 shown in FIG. 16 can also be replaced with the high-clip-and-inversion circuit 36c' and the computing circuit 36d'.

Figure 24:
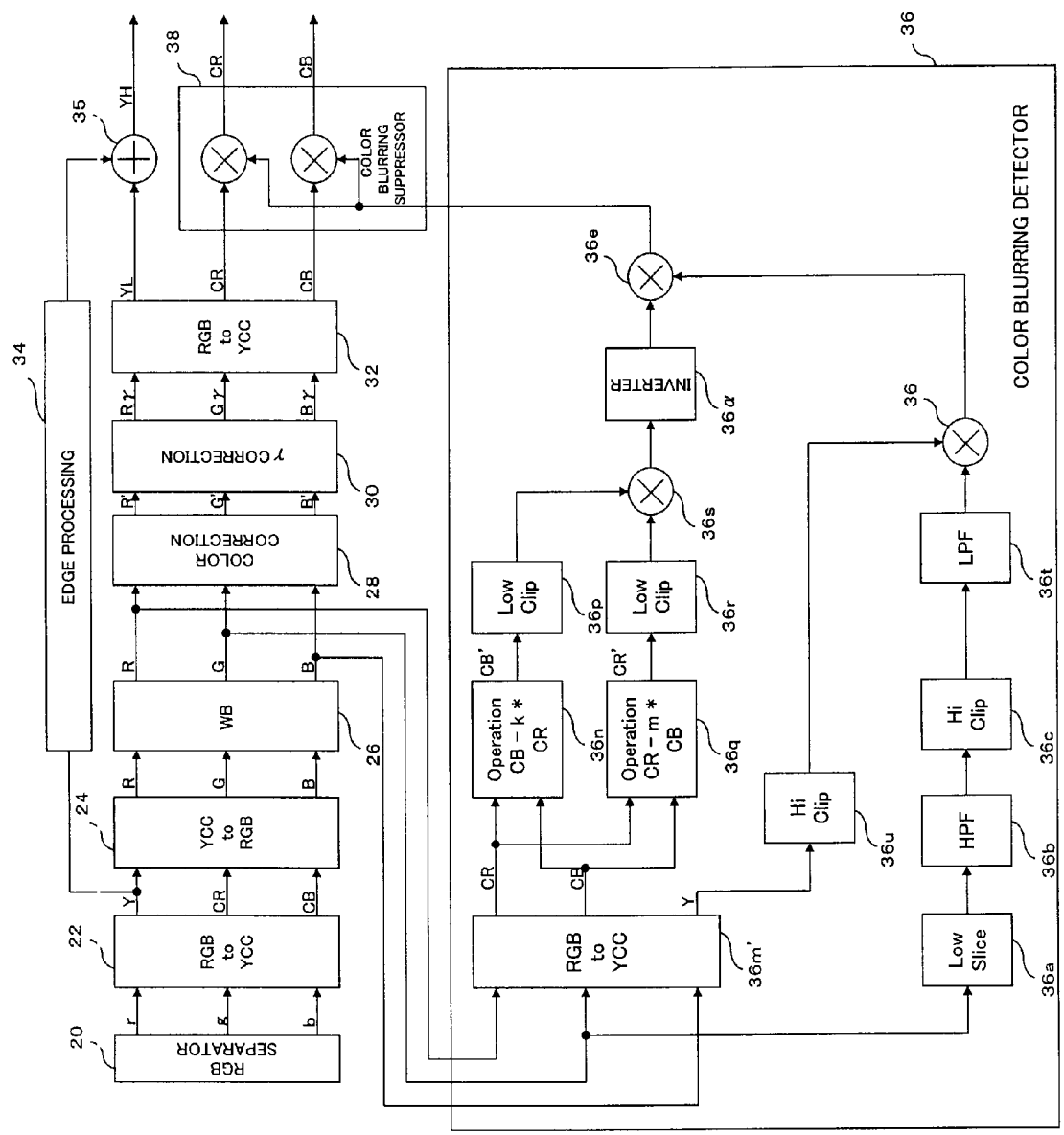
FIG. 24 is a block diagram of a color-blurring detection circuit according to yet another embodiment of the present invention.

Although, in the configuration shown in FIG. 11, the G signal is supplied to the high clip circuit 36u, the color-difference signal generation circuit 36m may be replaced with the brightness color-difference signal generation circuit 36m', to thus supply the generated brightness signal Y to the high clip circuit 36u, as shown in FIG. 24. The high clip circuit 36u subjects the brightness signal Y to high clipping, and supplies the resultant signal to the multiplying circuit 36v.

As above, the embodiments of the present invention have been described while taking the digital camera as an example. However, the present invention is not applied solely to the imaging device such as a digital camera or the like. For instance, the present invention can also be incorporated into an image-processing program to be installed in a computer. Processing to be executed in the above respective embodiments is incorporated into an image-processing program in the form of sub-routines. A subject image is input by way of an input device and stored in memory. A CPU of the computer loads the program from an auxiliary storage device into a main storage device; reads the subject image from the memory; sequentially executes the program to thus detect color-blurring (chromatic aberration) arising in the edge portion of highlight of the subject image; and displays the image on a display device, such as a liquid-crystal display, while suppressing color-blurring of that area. A technique for causing the computer to subject an input image signal to various processing operations shown in FIG. 3, such as low slice processing, high-pass filter processing, high clip processing, and multiplication processing, is well known.

The invention has been described in detail with particular reference to certain preferred embodiments thereof, but it will be understood that variations and modifications can be effected within the spirit and scope of the invention.

PARTS LIST

10 Lens
12 CCD
14 CDS
16 Analog-to-digital (A/D) converter
18 Image memory
20 RGB separation circuit
22 Brightness color-difference signal generation circuit
24 RGB signal generation circuit
26 White balance (WB) adjustment circuit
28 Color correction circuit
30 γ correction circuit
32 Brightness color-difference signal generation circuit
34 Edge-processing circuit
35 Addition circuit
36 Color-blurring detection circuit
36a Low slice circuit
36b High-pass filer (HPF)
36c High clip circuit
36c' High-clip-and-inversion circuit
36d High clip circuit
36d' Computing circuit
36e Multiplying circuit
36f Low slice circuit
36g High-pass filter
36h Low clip circuit
36i Inverter
36j Absolute value circuit (ABS)
36k Low-pass filter
36m Color-difference signal generation circuit
36m' Brightness color-difference signal generation circuit
36n Computing circuit
36p Low clip circuit
36q Computing circuit
36r Low clip circuit
36s Multiplying circuit
36t Low-pass filter
36u High clip circuit
36v Multiplying circuit
36w Low-pass filter
36x Low-clip filter
36y Inverter
36z Multiplying circuit
36a1 Low slice circuit
36a2 Low slice circuit
36b1 High-pass filter
36b2 High-pass filter
36c1 High clip circuit
36c2 High clip circuit
36e1 Multiplying circuit
36e2 Multiplying circuit
36n1 Computing circuit
36n2 Computing circuit
36p1 Low clip circuit
36p2 Low clip circuit
36q1 Computing circuit
36q2 Computing circuit
36r1 Low clip circuit
36r2 Low clip circuit
36s1 Multiplying circuit
36s2 Multiplying circuit
36t1 Low-pass filter
36t2 Low-pass filter 36u1 High clip circuit
36u2 Low clip circuit
36v1 Multiplying circuit
36v2 Multiplying circuit
36α Inverter
36β Low clip circuit
36γ Filter
36δ Maximum value circuit (MAX)
37 Color-blurring suppressor circuit
38 Color-blurring suppressor circuit
38a Multiplying circuit
38b Multiplying circuit
38c Multiplying circuit
38d Brightness color-difference signal generation circuit
38e RGB signal generation circuit
40 Image memory
42 Compression-and-expansion circuit
44 CPU
46 LCD
48 Recording medium
50 Timing generator (TG)
52 Memory controller
54 Operation section
100 Chart
200 Color-blurring

The invention claimed is:

1. A chromatic aberration suppressor circuit for suppressing chromatic aberration which arises in a high-brightness portion of a subject, the circuit comprising:
   detection means for detecting a chromatic aberration portion from an image signal which pertains to the subject and is to undergo gamma correction;
   gamma correction means for subjecting the image signal to gamma correction;
   suppression means for suppressing a color component of the chromatic aberration portion, which has been detected by the detection means, in the image signal after having undergone gamma correction performed by the gamma correction means; and wherein the detection means detects the chromatic aberration portion on the basis of a G signal among an R signal, a G signal, and a B signal constituting the image signal that is to undergo gamma correction.

2. A chromatic aberration suppressor circuit for suppressing chromatic aberration which arises in a high-brightness portion of a subject, the circuit comprising:
   detection means for detecting a chromatic aberration portion from an image signal which pertains to the subject and is to undergo gamma correction;
   gamma correction means for subjecting the image signal to gamma correction;
   suppression means for suppressing a color component of the chromatic aberration portion, which has been detected by the detection means, in the image signal after having undergone gamma correction performed by the gamma correction means; and wherein the detection means has edge detection means for detecting an edge of a high-brightness portion from the image signal that is to undergo gamma correction.

3. The chromatic aberration suppressor circuit according to claim 2, wherein the detection means comprises:
   a slice circuit for slicing, at a predetermined level, the image signal that is to undergo gamma correction;
   a high-pass filter for extracting a high-frequency component of an image signal sliced by the slice circuit; and
   a clip circuit for clipping the signal, which has been output from the high-pass filter, at a second predetermined level.

4. The chromatic aberration suppressor circuit according to claim 3, wherein the detection means further includes:
   a second clip circuit for clipping, at the first predetermined level, the image signal that is to undergo gamma correction; and
   a multiplying circuit for multiplying a signal output from the clip circuit by a signal output from the second clip circuit.

5. The chromatic aberration suppressor circuit according to claim 2, wherein the detection means includes:
   a first slice circuit for slicing, at a first predetermined level, a G signal among an R signal, the G signal, and a B signal constituting the image signal that is to undergo gamma correction;
   a first high-pass filter for extracting a high-frequency component of the G signal sliced by the first slice circuit;
   a first clip circuit for clipping a signal, which has been output from the first high-pass filter, at a second predetermined level to a high clip level or a low clip level;
   a second slice circuit for slicing, at the first predetermined level, the B signal among the R signal, the G signal, and the B signal constituting a gamma-corrected signal;
   a second high pass filter for extracting a high-frequency component of the B signal sliced by the second slice circuit;
   a second clip circuit for clipping, at the second predetermined level, a signal output from the second high-pass filter with a polarity differing from that of the first clip circuit; and
   a multiplying circuit for subjecting either a signal output from the first clip circuit or a signal output from the second clip circuit to inversion and multiplication.

6. The chromatic aberration suppressor circuit according to claim 2, wherein the detection means includes:
   a first slice circuit for slicing, at a first predetermined level, a G signal among an R signal, the G signal, and a B signal constituting the image signal that is to undergo gamma correction;
   a first high-pass filter for extracting a high-frequency component of the G signal sliced by the first slice circuit;
   a clip circuit for clipping a signal, which has been output from the first high-pass filter, at a second predetermined level to either one of a high clip level and a low clip level;
   a second slice circuit for slicing, at the first predetermined level, the B signal among the R signal, the G signal, and the B signal constituting a gamma-corrected signal;
   a second high pass filter for extracting a high-frequency component of the B signal sliced by the second slice circuit;
   an absolute value circuit for detecting an absolute value of a signal output from the second high-pass filter;
   a low-pass filter for extracting a low-frequency component from a signal output from the absolute value circuit; and
   a multiplying circuit for inverting and multiplying either one of a signal output from the low-pass filter and a signal output from the absolute value circuit.

7. The chromatic aberration suppressor circuit according to claim 2, wherein the detection means includes:
   means for extracting a specific color range from the image signal that is to undergo gamma correction; and
   means for extracting a signal having an extracted color range in the detected edge.

8. The chromatic aberration suppressor circuit according to claim 2, wherein the detection means includes:

a slice circuit for slicing, at a first predetermined level, the image signal that is to undergo gamma correction;
a high-pass filter for extracting a high-frequency component of the image signal sliced by the slice circuit;
a clip circuit for clipping, at a second predetermined level, a signal output from the high-pass filter;
a color-difference signal generation circuit for generating a color-difference signal from the image that is to undergo gamma correction;
an extraction circuit for extracting a signal of specific color range from the color-difference signal; and
a multiplying circuit for multiplying a signal output from the clip circuit by a signal output from the extraction circuit.

9. The chromatic aberration suppressor circuit according to claim 8, wherein the color-difference signal generation circuit generates color-difference signals CR and CB from an R signal, a G signal, and a B signal which constitute the image signal; and
the extraction means defines the specific color range as follows while taking "k" and "m" as parameters:

$$CB'=CB-k \cdot CR>0$$

$$CR'=CR-m \cdot CB>0.$$

10. The chromatic aberration suppressor circuit according to claim 8, wherein the specific color range corresponds to magenta.

11. The chromatic aberration suppressor circuit according to claim 8, wherein the detection means further includes:
a second extraction circuit for extracting, from a signal output from the extraction circuit, a signal whose signal level of a given value or more is smaller than or equal to a predetermined width; and
the multiplying circuit multiplies a signal output from the clip circuit by a signal output from the second extraction circuit.

12. The chromatic aberration suppressor circuit according to claim 8, wherein the color-difference signal generation circuit generates color-difference signals CR and CB from an R signal, a G signal, and a B signal which constitute the image signal; and
the extraction means defines the specific color range as follows while taking "c" and "d" as parameters:

$$CB''=c \cdot CB-CR<0$$

$$CR'=d \cdot CR-CB>0.$$

13. The chromatic aberration suppressor circuit according to claim 8, wherein the specific color range corresponds to cyan.

14. The chromatic aberration suppressor circuit according to claim 9, wherein the slice circuit of the detection means slices a level of the G signal in the image signal that is to undergo gamma correction.

15. The chromatic aberration suppressor circuit according to claim 12, wherein the slice circuit of the detection means slices a level of the R signal in the image signal that is to undergo gamma correction.

16. An imaging device comprising the chromatic aberration suppressor circuit according to claim 2.

17. The chromatic aberration suppressor circuit according to claim 2, wherein the detection means includes:
a slice circuit for slicing, at a first predetermined level, the image signal that is to undergo gamma correction;
a high-pass filter for extracting a high-frequency component of the image signal sliced by the slice circuit;
a clip-and-inverter circuit for clipping at a second predetermined level a signal output from the high-pass filter, to thus invert the signal; and
a computing circuit for computing 1-S with reference to a signal S which is output from the clip-and-inverter circuit.

18. The chromatic aberration suppressor circuit according to claim 2, wherein the detection means includes:
a slice circuit for slicing, at a first predetermined level, the image signal that is to undergo gamma correction;
a high-pass filter for extracting a high-frequency component of the image signal sliced by the slice circuit;
a clip-and-inverter circuit for clipping at a second predetermined level a signal output from the high-pass filter to thus invert the signal;
a computing circuit for computing 1-S with reference to a signal S output from the clip-and-inverter circuit;
a color-difference signal generation circuit for generating a color-difference signal from the image signal that is to undergo gamma correction;
an extraction circuit for extracting a signal of a specific color range from the color-difference signal; and
a multiplying circuit for multiplying a signal output from the computing circuit by a signal output from the extraction circuit.

19. The chromatic aberration suppressor circuit according to claim 2, wherein a clip-and-inverter circuit coupled to the detection means simultaneously performs clipping and inversion by means of converting an input signal by use of a weighting coefficient which specifies an output level in a proportion of 1:1 with respect to an input level.

20. A chromatic aberration suppressor circuit for suppressing chromatic aberration which arises in a high-brightness portion of a subject, the circuit comprising:
detection means for detecting a chromatic aberration portion from an image signal which pertains to the subject and is to undergo gamma correction;
suppression means for suppressing a color component and a brightness component of the chromatic aberration portion, which have been detected by the detection means, in the image signal; and
gamma correction means for subjecting to gamma correction the image signal suppressed by the suppression means.

21. The chromatic aberration suppressor circuit according to claim 20, wherein the detection means detects the chromatic aberration portion on the basis of a G signal among an R signal, the G signal, and a B signal constituting the image signal that is to undergo gamma correction.

22. The chromatic aberration suppressor circuit according to claim 20, wherein the detection means has edge detection means for detecting an edge of a high-brightness portion from the image signal that is to undergo gamma correction.

23. The chromatic aberration suppressor circuit according to claim 20, wherein the detection means includes:
a slice circuit for slicing, at a first predetermined level, the image signal that is to undergo gamma correction;
a high-pass filter for extracting a high-frequency component of the image signal sliced by the slice circuit; and
a clip circuit for clipping, at a second predetermined level, a signal output from the high-pass filter.

24. The chromatic aberration suppressor circuit according to claim 20, wherein the detection means includes a slice circuit for slicing, at a first predetermined level, the image signal that is to undergo gamma correction;
a high-pass filter for extracting a high-frequency component of the image signal sliced by the slice circuit;

a clip-and-inverter circuit for clipping at a second predetermined level a signal output from the high-pass filter to thus invert the signal; and a computing circuit for computing 1-S with reference to a signal S output from the clip-and-inverter circuit.

25. A computer readable medium having encoded thereon a chromatic aberration suppression program comprising a set of instructions when executed by a computer to implement a method of suppressing chromatic aberration of a subject image, the method comprising the steps of:

a step of detecting a chromatic aberration portion from an image signal which pertains to the subject and is to undergo gamma correction;

a step of detecting an edge of a high-brightness portion from the image signal that is to undergo gamma correction;

a step of subjecting the image signal to gamma correction; and a step of suppressing a color component of the detected chromatic aberration portion and displaying the gamma-corrected image signal on a display device.

26. A computer readable medium having encoded thereon a chromatic aberration suppression program comprising a set of instructions when executed by a computer to implement a method of suppressing chromatic aberration of a subject image, the method comprising the steps of:

a step of detecting a chromatic aberration portion from an image signal which pertains to the subject and is to undergo gamma correction;

a step of suppressing a color component and a brightness component in the detected chromatic aberration portion with respect to the image signal; and a step of subjecting a suppressed image signal to gamma correction and displaying the corrected image signal on a display device.

* * * * *

UNITED STATES PATENT AND TRADEMARK OFFICE
CERTIFICATE OF CORRECTION

| | |
|---|---|
| PATENT NO. | : 7,583,301 B2 |
| APPLICATION NO. | : 11/423770 |
| DATED | : September 1, 2009 |
| INVENTOR(S) | : Junzo Sakurai et al. |

Page 1 of 1

It is certified that error appears in the above-identified patent and that said Letters Patent is hereby corrected as shown below:

| Issued Patent | | Description of Error |
|---|---|---|
| Column | Line | |
| Title Page Col. 1 (Foreign Application Priority Data) | 1 | Delete "Jan. 11, 2005" and insert -- Nov. 1, 2005 --, therefor. |

Signed and Sealed this

Twenty-sixth Day of January, 2010

David J. Kappos
*Director of the United States Patent and Trademark Office*